(12) United States Patent
Horiuchi et al.

(10) Patent No.: US 11,150,706 B2
(45) Date of Patent: Oct. 19, 2021

(54) CIRCUIT SUBSTRATE AND DISPLAY PANEL

(71) Applicant: Sharp Kabushiki Kaisha, Osaka (JP)

(72) Inventors: Satoshi Horiuchi, Sakai (JP); Seijirou Gyouten, Sakai (JP); Yoshihiro Asai, Sakai (JP); Seiya Kawamorita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/885,322

(22) Filed: May 28, 2020

(65) Prior Publication Data
US 2020/0379523 A1    Dec. 3, 2020

Related U.S. Application Data

(60) Provisional application No. 62/854,469, filed on May 30, 2019.

(51) Int. Cl.
*G06F 1/18* (2006.01)
*G06F 1/16* (2006.01)

(52) U.S. Cl.
CPC ............ *G06F 1/189* (2013.01); *G06F 1/1626* (2013.01)

(58) Field of Classification Search
CPC ..................................................... G06F 3/041
See application file for complete search history.

(56) References Cited

U.S. PATENT DOCUMENTS

| 2013/0016047 A1* | 1/2013 | Masumoto | .......... G02F 1/13338 345/173 |
| 2016/0247478 A1* | 8/2016 | Ishige | .................. G09G 3/3677 |

FOREIGN PATENT DOCUMENTS

JP    2016-148751 A    8/2016

\* cited by examiner

*Primary Examiner* — Jerry Wu
(74) *Attorney, Agent, or Firm* — Keating & Bennett, LLP

(57) ABSTRACT

A plurality of circuit portions include a central side circuit portion connected to at least a central side-wiring line lead-out portion among a plurality of wiring line lead-out portions, and an end side circuit portion that is connected to at least an end side-wiring line lead-out portion among the plurality of wiring line lead-out portions, is also located on an end side in a first direction being an extending direction of a central side-outer shape portion having a linear shape with respect to the central side circuit portion, and is configured such that a dimension in a second direction being a direction in which the plurality of circuit portions and a central side region are aligned is smaller than that of the central side circuit portion.

11 Claims, 11 Drawing Sheets

CIRCUIT SUBSTRATE AND DISPLAY PANEL

BACKGROUND OF THE INVENTION

Field of the Invention

The present invention relates to a circuit substrate and a display panel.

Description of the Background Art

A display device described in Japanese Unexamined Patent Application Publication No. 2016-148751 below has been known as an example of a conventional display device. The display device described in Japanese Unexamined Patent Application Publication No. 2016-148751 includes a scanning line drive circuit, a plurality of scanning lines, and a substrate on which the scanning line drive circuit and the scanning lines are provided. The scanning line drive circuit is provided in a region arranged along a side portion on a positive side in an X-axis direction of a display region of the substrate. The scanning line drive circuit includes a plurality of transfer circuits each connected to each of the plurality of scanning lines. A shape of a certain transfer circuit among the plurality of transfer circuits is different from a shape of a transfer circuit arranged on a negative side in a Y-axis direction with respect to the certain transfer circuit.

SUMMARY

According to the display device described in Japanese Unexamined Patent Application Publication No. 2016-148751 described above, an area of a region arranged on one side in a direction in which the scanning line extends with respect to the display region can be reduced. By the way, the display device described in Japanese Unexamined Patent Application Publication No. 2016-148751 is a so-called special-form display in which a planar shape has a shape different from a rectangular shape, and thus a frame region in which the transfer circuit is arranged has a non-linear shape. When the transfer circuit is arranged in the frame region that forms a non-linear shape in this way, there is a risk that problems may arise such that action of the transfer circuit is more likely to become unstable due to a variable positional relationship among the plurality of transfer circuits disposed in the frame region, and a circuit configuration of the transfer circuit needs to be individually designed according to an arrangement, which is complicated.

One aspect of the present invention has been completed based on the circumstances described above, and an object of the present invention is to optimize a positional relationship among a plurality of circuit portions and also solve a problem that arises in association with the positional relationship.

(1) One embodiment of the present invention is a circuit substrate including, a substrate including, in an outer shape, a central side-outer shape portion having a linear shape, and an end side-outer shape portion that is located on an end side with respect to the central side-outer shape portion in a first direction being an extending direction of the central side-outer shape portion and has a non-linear shape, a wiring line region having a planar shape disposed in a plate surface of the substrate, the wiring line region including a central side region including an outer shape along the central side-outer shape portion and an end side region that is located on an end side with respect to the central side region in the first direction and includes an outer shape along the end side-outer shape portion, a plurality of wiring lines disposed in the wiring line region, the plurality of wiring lines including a central side wiring line disposed in the central side region and an end side wiring line disposed in the end side region, a frame region disposed surrounding the wiring line region in the plate surface of the substrate, a plurality of wiring line lead-out portions disposed in the frame region and connected to the plurality of wiring lines, the plurality of wiring line lead-out portions including a central side-wiring line lead-out portion connected to the central side wiring line and an end side-wiring line lead-out portion connected to the end side wiring line, and a plurality of circuit portions aligned along the first direction in the frame region, the plurality of circuit portions being disposed side by side and spaced from the central side region and being connected to the plurality of wiring line lead-out portions, wherein the plurality of circuit portions include a central side circuit portion connected to at least the central side-wiring line lead-out portion among the plurality of wiring line lead-out portions, and an end side circuit portion that is connected to at least the end side-wiring line lead-out portion among the plurality of wiring line lead-out portions, is also located on an end side in the first direction with respect to the central side circuit portion, and is configured such that a dimension in a second direction being a direction in which the plurality of circuit portions and the central side region are aligned is smaller than that of the central side circuit portion.

(2) Further, in addition to the configuration of (1) described above, an embodiment of the present invention is a circuit substrate in which the end side circuit portion is configured such that a dimension in the first direction is greater than that of the central side circuit portion.

(3) Further, in addition to the configuration of (2) described above, an embodiment of the present invention is a circuit substrate in which an occupancy area occupied by the central side circuit portion and an occupancy area occupied by the end side circuit portion in the plate surface of the substrate are configured to be equal.

(4) Further, in addition to the configuration of any one of (1) to (3) described above, an embodiment of the present invention is a circuit substrate in which the plurality of circuit portions include an intermediate circuit portion that is disposed to be sandwiched between the central side circuit portion and the end side circuit portion in the first direction, and is also configured such that a dimension in the second direction is smaller than that of the central side circuit portion and greater than that of the end side circuit portion.

(5) Further, in addition to the configuration of (4) described above, an embodiment of the present invention is a circuit substrate in which the plurality of intermediate circuit portions are provided, and the intermediate circuit portions include the one connected to the central side-wiring line lead-out portion and the one connected to the end side-wiring line lead-out portion.

(6) Further, in addition to the configuration of (4) or (5) described above, an embodiment of the present invention is a circuit substrate in which the intermediate circuit portion is configured such that a dimension in the first direction is greater than that of the central side circuit portion and smaller than that of the end side circuit portion.

(7) Further, in addition to the configuration of any one of (1) to (6) described above, an embodiment of the present invention is a circuit substrate in which the plurality of wiring lines extend along the second direction, the circuit substrate further includes a plurality of second wiring lines that extend along the first direction in the wiring line region, and also intersects the plurality of wiring lines, and the end side wiring line is disposed such that the number of the second wiring lines intersecting the end side wiring line is smaller than the number of the second wiring lines intersecting the central side wiring line.

(8) Further, in addition to the configuration of (7) described above, an embodiment of the present invention is a circuit substrate in which an occupancy area occupied by the end side circuit portion in the plate surface of the substrate is configured to be smaller than an occupancy area occupied by the central side circuit portion.

(9) Further, in addition to the configuration of any one of (1) to (8) described above, an embodiment of the present invention is a circuit substrate in which the end side-wiring line lead-out portion connected to at least the end side circuit portion located closest to an end in the first direction among the plurality of circuit portions is configured to be led out from a side portion on an end side in the first direction in the end side circuit portion.

(10) Further, one embodiment of the present invention is a circuit substrate including: a substrate including, in an outer shape, a central side-outer shape portion having a linear shape, and an end side-outer shape portion that is located on an end side with respect to the central side-outer shape portion in a first direction being an extending direction of the central side-outer shape portion and has a non-linear shape, a wiring line region having a planar shape disposed in a plate surface of the substrate, the wiring line region including a central side region including an outer shape along the central side-outer shape portion and an end side region that is located on an end side with respect to the central side region in the first direction and includes an outer shape along the end side-outer shape portion, a plurality of wiring lines disposed in the wiring line region, the plurality of wiring lines including a central side wiring line disposed in the central side region and an end side wiring line disposed in the end side region, a frame region disposed surrounding the wiring line region in the plate surface of the substrate, a plurality of wiring line lead-out portions disposed in the frame region and connected to the plurality of wiring lines, the plurality of wiring line lead-out portions including a central side-wiring line lead-out portion connected to the central side wiring line and an end side-wiring line lead-out portion connected to the end side wiring line; and a plurality of circuit portions aligned along the first direction in the frame region, the plurality of circuit portions being disposed side by side and spaced from the central side region and being connected to the plurality of wiring line lead-out portions, wherein the plurality of circuit portions include a central side circuit portion connected to at least the central side-wiring line lead-out portion among the plurality of wiring line lead-out portions, and an end side circuit portion that is connected to at least the end side-wiring line lead-out portion among the plurality of wiring line lead-out portions and is also located on an end side in the first direction with respect to the central side circuit portion, and the end side-wiring line lead-out portion connected to at least the end side circuit portion located closest to an end in the first direction among the plurality of circuit portions is configured to be led out from a side portion on an end side in the first direction in the end side circuit portion.

(11) Further, one embodiment of the present invention is a display panel using the circuit substrate according to any one of (1) to (10) described above.

According to one aspect of the present invention, while optimizing a positional relationship of a plurality of circuit portions, a problem arises associating therewith can be solved.

DESCRIPTION OF THE PREFERRED EMBODIMENTS

First Embodiment

A first embodiment of the present invention will be described with reference to FIG. 1 to FIG. 6. In the present embodiment, a liquid crystal panel (display panel) 10 is exemplified. Note that an X axis, a Y axis, and a Z axis are illustrated in a part of each drawing, and each axial direction is illustrated to be the direction illustrated in each drawing.

Figure 1:
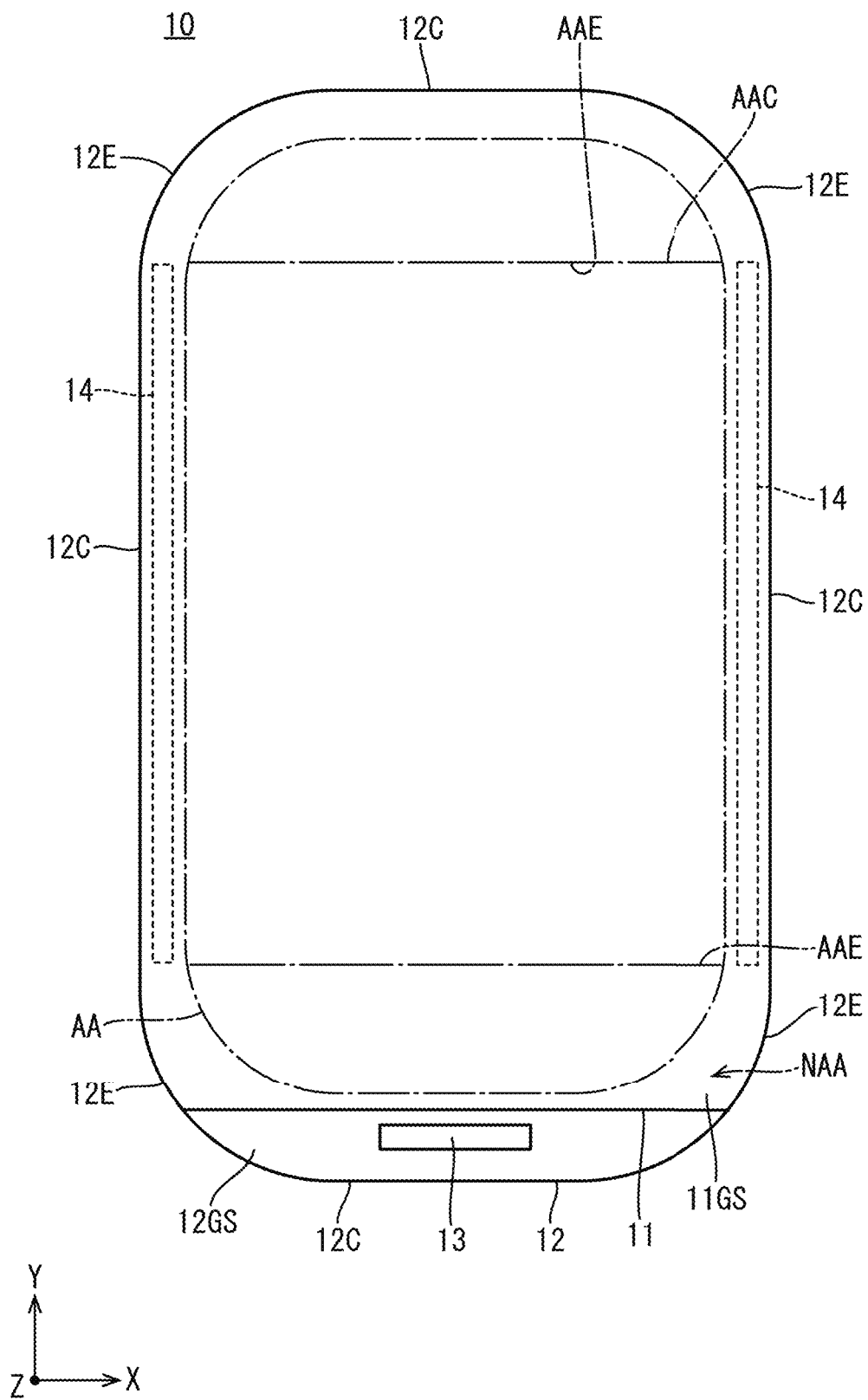
FIG. 1 is a plan view of a liquid crystal panel according to a first embodiment of the present invention.

As illustrated in FIG. 1, in the liquid crystal panel 10 according to the present embodiment, a planar shape as a whole is a substantially vertically oriented rectangular shape, and each corner portion of four corners has a rounded shape. FIG. 1 is a plan view of the liquid crystal panel 10. The liquid crystal panel 10 having such a planar shape is preferably used for a portable information terminal such as a smartphone, which is not necessarily limited thereto. A short side direction of the liquid crystal panel 10, a long side direction, and a plate thickness direction coincide with an X-axis direction, a Y-axis direction, and a Z-axis direction, respectively. The liquid crystal panel 10 can display an image by using illumination light emitted from a backlight device (illumination device). In the liquid crystal panel 10, a central side portion of a screen is a display region (wiring line region) AA in which an image is displayed, whereas a frame-shaped outer peripheral side portion surrounding the display region AA in the screen is a non-display region (frame region) NAA in which an image is not displayed. Of these, the display region AA is a "wiring line region" in which a gate wiring line 15 and the like described below are disposed and spread out in a plane shape, whereas the non-display region NAA is a "frame region" surrounding the "wiring line region". Note that a range surrounded by a dot-dash line in FIG. 1 is the display region AA.

As illustrated in FIG. 1, the liquid crystal panel 10 is configured such that a liquid crystal layer including a liquid crystal molecule being a substance having optical characteristics of which change depending on an applied electrical field is sandwiched between a pair of glass substrates 11 and 12 that are almost transparent and have excellent light-transmitting properties. Of the pair of substrates 11 and 12, a CF substrate (counter substrate) 11 is disposed on a front side, and an array substrate (circuit substrate, active matrix substrate, element substrate) 12 is disposed on a back side. The CF substrate 11 and the array substrate 12 are both formed by layering various films on an inner surface side of glass substrates (substrates) 11GS and 12GS. Of these, the array substrate 12 has a long side dimension greater than a long side dimension of the CF substrate 11, and one end portion in the long side direction does not overlap the CF substrate 11, and a driver 13 and a flexible substrate are mounted thereto. The driver 13 is formed of an LSI chip including a drive circuit therein, is COG (Chip On Glass)-mounted on the glass substrate 12GS of the array substrate 12, and processes various signals transmitted by the flexible substrate. A pair of gate circuit portions (circuit portion group) 14 are provided in the non-display region NAA of the glass substrate 12GS of the array substrate 12 so as to sandwich the display region AA from both sides in the X-axis direction. The gate circuit portion 14 extends along the Y-axis direction. The gate circuit portion 14 is configured to supply a scanning signal to the gate wiring line 15 described below, and is provided in a monolithic manner on the glass substrate 12GS of the array substrate 12. Of the pair of gate circuit portions 14, the gate circuit portion 14 on the left side illustrated in FIG. 1 supplies the scanning signal to the odd-numbered gate wiring line 15 counted from the upper side illustrated in FIG. 1, and the gate circuit portion 14 on the right side illustrated in FIG. 1 supplies the scanning signal to the even-numbered gate wiring line 15 counted from the top illustrated in FIG. 1. A specific circuit configuration of the gate circuit portion 14 and the like will be described later in detail.

Figure 2:
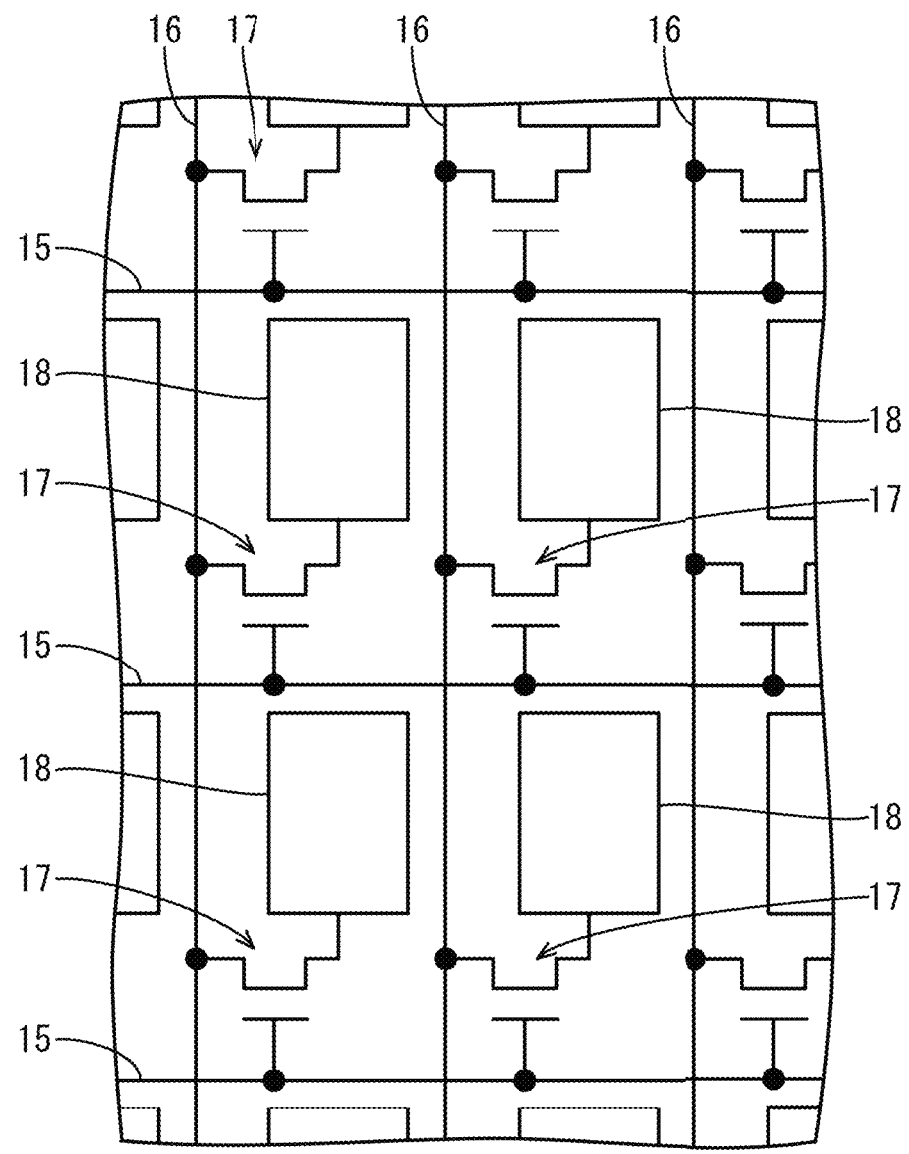
FIG. 2 is a circuit diagram illustrating a layout of pixels in a display region of the liquid crystal panel.
Figure 2:
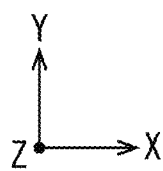

As illustrated in FIG. 2, a plurality of gate wiring lines (wiring lines, scanning wiring lines) 15 and a plurality of source wiring lines (second wiring lines, signal wiring lines, data wiring lines) 16 that form a lattice shape are disposed on the inner surface side of the display region AA of the glass substrate 12GS of the array substrate 12. A TFT 17 being a switching element and a pixel electrode 18 are provided near each intersection portion of the plurality of gate wiring lines and the plurality of source wiring lines. FIG. 2 is a circuit diagram illustrating a layout of pixels in the display region AA of the array substrate 12. The gate wiring line 15 extends along the X-axis direction (second direction) horizontally across the display region AA and is connected to a gate electrode of each TFT 17, whereas the source wiring line 16 extends along the Y-axis direction (first direction) vertically across the display region AA and is connected to a source electrode of each TFT 17. The plurality of gate wiring lines 15 are disposed side by side and spaced along the Y-axis direction, whereas the plurality of source wiring lines 16 are disposed and spaced along the X-axis direction. The plurality of TFTs 17 and the plurality of pixel electrodes 18 are arranged in a plane in a matrix shape (matrix) regularly along the X-axis direction and the Y-axis direction, and each of the plurality of pixel electrodes 18 is respectively connected to a drain electrode of each of the plurality of TFTs 17. The TFT 17 is driven based on the scanning signal supplied to the gate wiring line 15, and a potential based on an image signal (signal, data signal) accordingly supplied to the source wiring line 16 is charged to the pixel electrode 18. In contrast, color filters in three colors that exhibit red (R), green (G), and blue (B) and are disposed so as to overlap each of the pixel electrodes 18, a light blocking portion (black matrix) that partitions adjacent color filters, and the like are provided on the inner surface side of the display region AA of the CF substrate 11. In the liquid crystal panel 10, the R, G, and B color filters aligned along the X-axis direction and the three pixel electrodes 18 facing the respective color filters constitute pixels in three colors. The pixels are arranged at respective predetermined layout pitches in the X-axis direction and the Y-axis direction. Further, either the CF substrate 11 or the array substrate 12 is provided with a common electrode formed of a transparent electrode material similar to that of the pixel electrode 18 and superimposed and arranged so as to be spaced from the pixel electrode 18. In the liquid crystal panel 10, a predetermined electric field is applied to the liquid crystal layer based on a potential difference generated between the common electrode and each of the pixel electrodes 18, and thus a predetermined gray scale display can be performed by each pixel.

Herein, an outer shape of the glass substrate 12GS that constitutes the array substrate 12 will be described again with reference to FIG. 1. As illustrated in FIG. 1, the outer shape of the glass substrate 12GS of the array substrate 12 includes a central side-outer shape portion 12C having a linear shape, and an end side-outer shape portion 12E that is located on an end side in an extending direction of the central side-outer shape portion 12C with respect to the central side-outer shape portion 12C and has a non-linear shape. Specifically, four side portions constituting the outer shape of the array substrate 12 each include one central side-outer shape portion 12C and two end side-outer shape portions 12E that sandwich the central side-outer shape portion 12C from both end sides in the extending direction of the central side-outer shape portion 12C. A pair of central side-outer shape portions 12C included in a pair of long side portions of the array substrate 12 extend along the Y-axis direction, whereas a pair of central side-outer shape portions 12C included in a pair of short side portions extend along the X-axis direction. The end side-outer shape portion 12E is located at the corner portions of the four corners of the array substrate 12, and is curved so as to form an arc shape in a plan view. The display region AA in the liquid crystal panel 10 has a substantially vertically oriented rectangular shape with the rounded corner portions of the four corners corresponding to the outer shape of the array substrate 12 as described above. In the present embodiment, the display region AA having a planar shape as described above is divided into three regions in the Y-axis direction being an extending direction of the gate circuit portion 14. In other words, the display region AA includes a central side region AAC located on the central side in the Y-axis direction and a pair of end side regions AAE located on both end sides in the Y-axis direction with respect to the central side region AAC. The central side region AAC includes an outer shape having a linear shape along the central side-outer shape portion 12C on the side of the long side. The end side region AAE includes an outer shape having an arc shape (non-linear shape) along the end side-outer shape portion 12E that is located on the end side with respect to the central side-outer shape portion 12C on the side of the long side. Accordingly, it can be said that the non-display region NAA surrounding the display region AA in the array substrate 12 includes a linear portion sandwiched between the central side-outer shape portion 12C and the central side region AAC, and an arc-shaped portion (non-linear portion) sandwiched between the end side-outer shape portion 12E and the end side region AAE.

Figure 3:
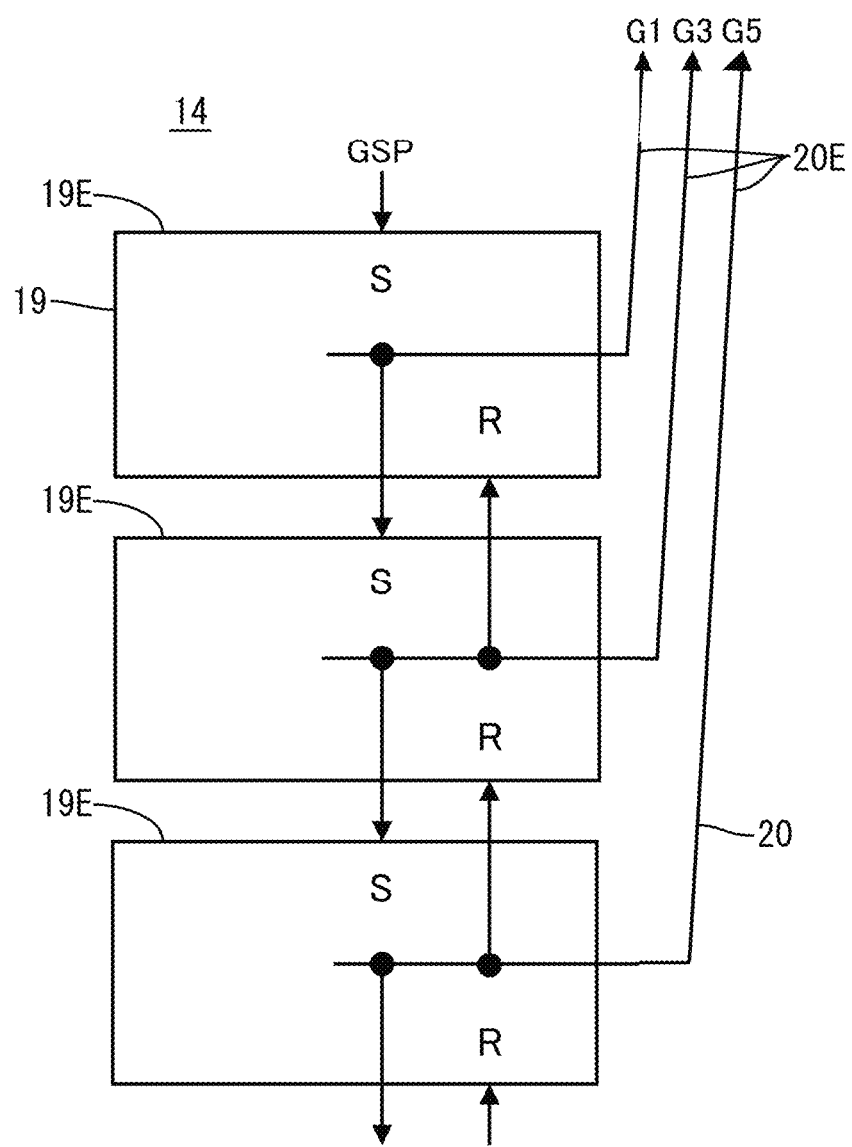
FIG. 3 is a block diagram illustrating a gate circuit portion that supplies a scanning signal to an odd-numbered gate wiring line.

Next, the gate circuit portion 14 will be described in detail using FIGS. 3 to 5. The gate circuit portion 14 is a so-called shift register circuit, and includes a plurality of circuit portions (unit circuits) 19, as illustrated in FIG. 3. FIG. 3 is a block diagram illustrating the gate circuit portion 14 that supplies a scanning signal to the odd-numbered gate wiring lines 15. The plurality of circuit portions 19 constituting the gate circuit portion 14 are configured such that one of the plurality of circuit portions 19 outputs a set signal S to one of the plurality of circuit portions 19 in a subsequent stage when outputting the scanning signal to the gate wiring line 15 to be connected, and outputs a reset signal R to one of the plurality of circuit portions 19 in a previous stage. Specifically, when a gate start pulse signal GSP is input to the circuit portion 19 in a first stage from the outside, the first circuit portion 19 in the first stage supplies a scanning signal G1 to the first gate wiring line 15 to be connected. At this time, the circuit portion 19 in the first stage outputs the set signal S to the circuit portion 19 in a third stage. The circuit portion 19 in the third stage supplies a scanning signal G3 to the third gate wiring line 15 based on the set signal S input from the circuit portion 19 in the first stage. At this time, the circuit portion 19 in the third stage outputs the set signal S to the circuit portion 19 in a fifth stage, and also outputs the reset signal R to the circuit portion 19 in the first stage. In this way, the plurality of circuit portions 19 constituting the gate circuit portion 14 can supply a scanning signal sequentially from an upper stage side to the gate wiring lines 15 to be connected. Note that the gate circuit portion 14 that supplies the scanning signal to the even-numbered gate wiring lines 15 also has a circuit configuration similar to that as described above.

Figure 4:
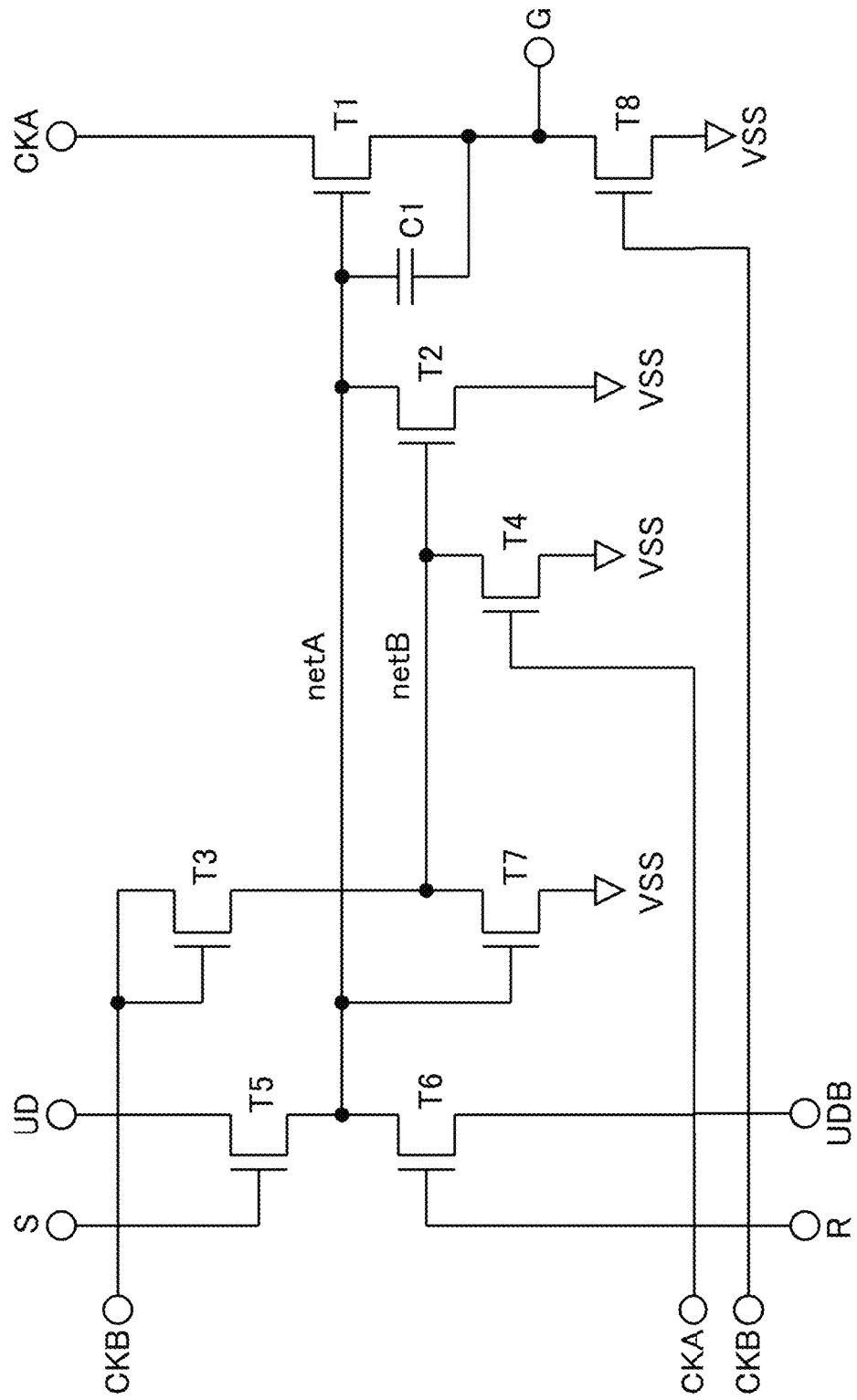
FIG. 4 is a circuit diagram illustrating a circuit configuration of a circuit portion constituting the gate circuit portion.

A specific circuit configuration of the circuit portion 19 is as illustrated in FIG. 4. FIG. 4 is a circuit diagram illustrating the circuit configuration of the circuit portion 19 constituting the gate circuit portion 14. The circuit portion 19 includes eight thin film transistors T1 to T8 and one capacitor C1. Note that, hereinafter, a connection wiring line connecting the thin film transistors T1, T2, T5, T6, and T7 and the capacitor C1 is referred to as an internal node netA. Similarly, a connection wiring line connecting the thin film transistors T2, T3, T4, and T7 is referred to as an internal node netB. The thin film transistor T includes a gate electrode connected to the internal node netA, a source electrode connected to a terminal to which a clock signal CKA is supplied, and a drain electrode connected to an output terminal to the gate wiring line 15. The thin film transistor T2 includes a gate electrode connected to the internal node netB, a source electrode connected to the internal node netA, and a drain electrode connected to a power supply voltage terminal VSS. The thin film transistor T3 includes a gate electrode and a source electrode connected to a terminal to which a clock signal CKB is supplied, and a drain electrode connected to the internal node netB. The thin film transistor T4 includes a gate electrode connected to a terminal to which the clock signal CKA is supplied, a source electrode connected to the internal node netB, and a drain electrode connected to the power supply voltage terminal VSS. The thin film transistor T5 includes a gate electrode connected to a terminal to which the set signal S or the gate start pulse signal GSP is supplied, a source electrode connected to a power supply voltage terminal UD, and a drain electrode connected to the internal node netA. The thin film transistor T6 includes a gate electrode connected to a terminal to which the reset signal R is supplied, a source electrode connected to the internal node netA, and a drain electrode connected to a power supply voltage terminal UDB. The thin film transistor T7 includes a gate electrode connected to the internal node netA, a source electrode connected to the internal node netB, and a drain electrode connected to the power supply voltage terminal VSS. The thin film transistor T8 includes a gate electrode connected to a terminal to which the clock signal CKB is supplied, a source electrode connected to the output terminal to the gate wiring line 15, and a drain electrode connected to the power supply voltage terminal VSS. The capacitor C1 includes one electrode connected to the internal node netA and the other electrode to the output terminal to the gate wiring line 15. The above-described "terminal to which the set signal S is supplied" is electrically connected to the gate wiring line 15 to which the circuit portion 19 in an (n−2)-th stage being a previous stage is to be connected when it is assumed that the circuit portion 19 is in an n-th stage. The above-described "terminal to which the reset signal R is supplied" is electrically connected to the gate wiring line 15 to which the circuit portion 19 in an (n+2)-th stage being a subsequent stage is to be connected when it is assumed that the circuit portion 19 is in the n-th stage.

Next, action of the circuit portion 19 will be described by using FIG. 5. FIG. 5 is a timing chart according to the action of the circuit portion 19. Prior to description of the action of the circuit portion 19, each signal and each potential illustrated in FIG. 5 will be described. In FIG. 5, potentials of the clock signals CKA and CKB, the power supply voltage terminal UD, the power supply voltage terminal UDB, the power supply voltage terminal VSS, the set signal S (the scanning signal G(n−2) in the previous stage), the scanning signal G(n), the reset signal R (the scanning signal G(n+2) in the subsequent stage), and the internal nodes netA and netB are illustrated from the top. In the present embodiment, as illustrated in FIG. 5, the power supply voltage terminal VSS and the power supply voltage terminal UDB are always held at a constant low level potential, whereas the power supply voltage terminal UD is always held at a constant high level potential. Note that, with regard to the power supply voltage terminal UD and the power supply voltage terminal UDB, the low and high potentials can be reversed. The clock signals CKA and CKB are both a rectangular wave, and a potential at a low level and a potential at a high level are alternately repeated at constant periods. The clock signal CKA and the clock signal CKB always have a reversed relationship between the potential at the low level and the potential at the high level. Further, the potential at the high level in the clock signals CKA and CKB is set to a value sufficient to bring each of the thin film transistors T1 to T8 into an ON state, and the clock signal CKA is set to a value sufficient to bring the TFT 17 connected to the gate wiring line 15 into the ON state.

The action of the circuit portion 19 will be described in detail. As illustrated in FIG. 5, at a time T10, the set signal S or the gate start pulse signal GSP is supplied to the gate electrode of the thin film transistor T5. Then, the thin film transistor T5 is brought into the ON state, and the potential at the high level of the power supply voltage terminal UD input to the source electrode of the thin film transistor T5 is supplied to the drain electrode. As a result, the capacitor C1 is charged, the internal node netA is held at the potential at the high level, and the thin film transistor T1 is also brought into the ON state. At this time, the clock signal CKA is set to the potential at the low level, whereas the clock signal CKB is set to the potential at the high level, and thus the thin film transistor T8 is brought into the ON state, and the source electrode of the thin film transistor T8 is set to the potential at the low level of the power supply voltage terminal VSS via the drain electrode. Further, although the thin film transistor T3 is brought into the ON state, the thin film transistor T7 is brought into the ON state by setting the internal node netA to the potential at the high level, and thus the internal node netB is set to the potential at the low level of the power supply voltage terminal VSS.

Figure 5:
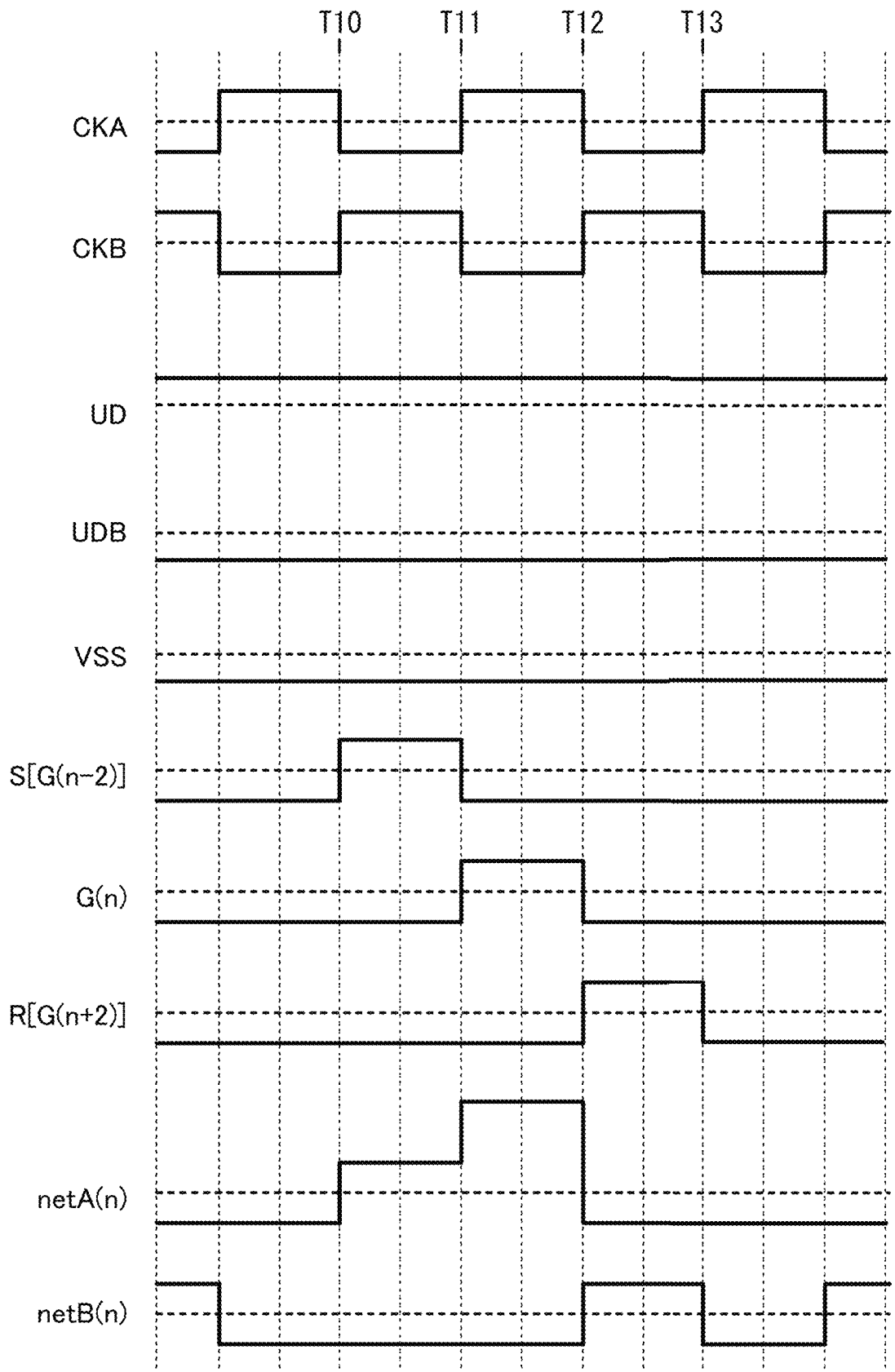
FIG. 5 is a timing chart according to an action of the circuit portion.

Next, as illustrated in FIG. 5, at a time T11, the clock signal CKA is set to the potential at the high level. Then, the potential at the high level of the clock signal CKA is supplied to the drain electrode from the source electrode of the thin film transistor T1 set in the ON state, and thus a potential of the output terminal of the gate wiring line 15 increases. At this time, the capacitor C1 is provided between the internal node netA and the output terminal to the gate wiring line 15, and thus the potential of the internal node netA also increases as the potential of the output terminal to the gate wiring line 15 increases. In other words, the internal node netA is bootstrapped. As a result, the gate electrode of the thin film transistor T1 has a greater potential, and thus the potential of the output terminal to the gate wiring line 15 reaches the potential at the high level of the clock signal CKA. In this way, the scanning signal G(n) at the high level is supplied to the gate wiring line 15. Further, the thin film transistor T4 is brought into the ON state by setting the clock signal CKA to the potential at the high level, and thus the internal node netB is set to the potential at the low level of the power supply voltage terminal VSS. Note that, at the time T11, since the clock signal CKB is set to the potential at the low level, the thin film transistor T8 is brought into the OFF state and the potential of the output terminal to the gate wiring line 15 is maintained at the high level. Further, the thin film transistor T5 is set in the OFF state.

As illustrated in FIG. 5, at a time T12, the clock signal CKA is set to the potential at the low level. Accordingly, the potential of the output terminal to the gate wiring line 15 decreases, and the potential of the internal node netA also decreases via the capacitor C1. At the time T12, the clock signal CKB is set to the potential at the high level, and thus the thin film transistors T3 and T8 are set in the ON state. As a result, the potential of the output terminal to the gate wiring line 15 is set to the potential at the low level of the power supply voltage terminal VSS, and the internal node netB is also set to the potential at the high level. Furthermore, at the time T12, the reset signal R is set to the potential at the high level, and thus the thin film transistor T6 is set in the ON state. In this way, the internal node netA is set to the potential at the low level of the power supply voltage terminal UDB. As described above, the output terminal to the gate wiring line 15 and the internal node netA are set to the potential at the low level. Subsequently, at a time T13, when the clock signal CKA is set to the potential at the high level and the clock signal CKB is set to the potential at the low level, the thin film transistor T4 is brought into the ON state, and thus the internal node netB is set to the potential at the low level of the power supply voltage terminal VSS.

Figure 6:
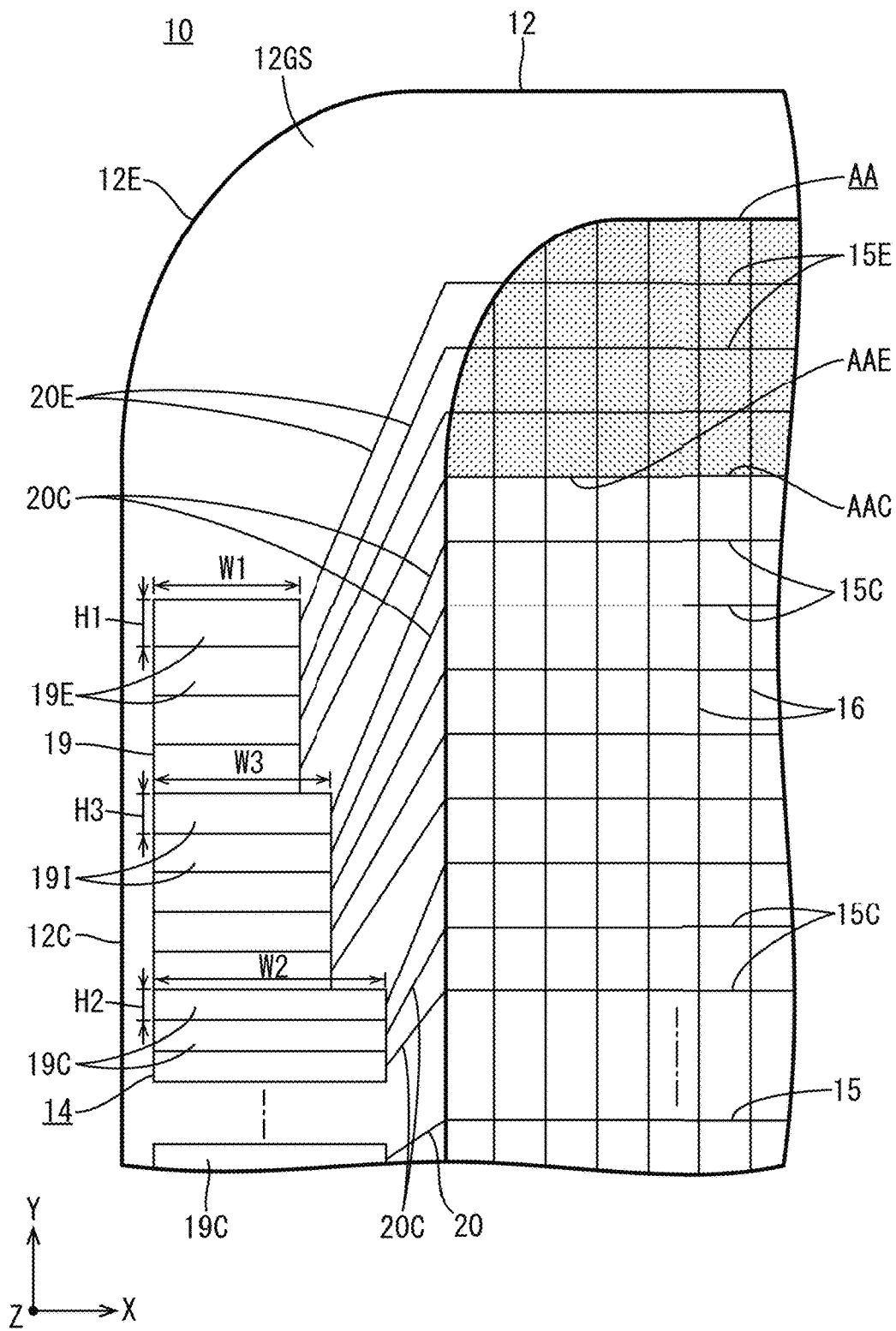
FIG. 6 is a plan view illustrating a circuit portion, a gate wiring line, and a wiring line lead-out portion in an array substrate.

As illustrated in FIG. 6, the gate wiring line 15 disposed in the display region AA is individually connected to the circuit portion 19 having the circuit configuration as described above by interposing a wiring line lead-out portion 20. FIG. 6 is a plan view illustrating the circuit portion 19, the gate wiring line 15, and the wiring line lead-out portion 20 in the array substrate 12. Also, in FIG. 6, the end side region AAE of the display region AA is illustrated as being shaded. A plurality of central side-gate wiring lines (central side wiring lines) 15C disposed in the central side region AAC and a plurality of end side-gate wiring lines (end side wiring lines) 15E disposed in the end side region AAE are included in the plurality of gate wiring lines 15. The wiring line lead-out portions 20 in the same number as that of the circuit portions 19 are disposed together with the circuit portions 19 in the non-display region NAA, and one end portion of the wiring line lead-out portions 20 is connected to the gate wiring lines 15 and the other end portion of the wiring line lead-out portions 20 is connected to the circuit portions 19. A plurality of central side-wiring line lead-out portions 20C connected to the central side-gate wiring lines 15C and a plurality of end side-wiring line lead-out portions 20E connected to the end side-gate wiring lines 15E are included in the plurality of wiring line lead-out portions 20. Further, the end side region AAE has a formation range from the gate wiring line 15 in the first stage to the gate wiring line 15 in a ninth stage being counted from an upper end in the Y-axis direction.

As illustrated in FIG. 6, the plurality of circuit portions 19 constituting the gate circuit portion 14 are disposed side by side in the non-display region NAA and spaced in the X-axis direction with respect to the central side region AAC. All of the plurality of circuit portions 19 are arranged so as to be sandwiched between the central side-outer shape portion 12C of the array substrate 12 and the central side region AAC in the X-axis direction, and are not sandwiched between the end side-outer shape portion 12E and the end side region AAE. In other words, the plurality of circuit portions 19 are arranged offset to the central side with respect to the end side-outer shape portion 12E and the end side region AAE in the Y-axis direction. The plurality of circuit portions 19 arranged in such a manner are linearly disposed side by side along the Y-axis direction, and the positional relationship thereof is substantially constant. Thus, as compared to a configuration in which a positional relationship among a plurality of transfer circuits is not constant as in the conventional manner, the action of the plurality of circuit portions 19 is easily stabilized, and the design of the circuit configuration of the circuit portion 19 is also facilitated.

As illustrated in FIG. 6, a plurality of central side circuit portions 19C connected to at least the central side-wiring line lead-out portions 20C among the plurality of wiring line lead-out portions 20, and a plurality of end side circuit portions 19E connected to at least the end side-wiring line lead-out portions 20E among the plurality of wiring line lead-out portions 20 are included in the plurality of circuit portions 19. The end side circuit portion 19E is located on the end side in the Y-axis direction (first direction) with respect to the central side-wiring line lead-out portion 20C. In such a configuration, the plurality of wiring line lead-out portions 20 are routed so as to fan out from the plurality of circuit portions 19 to the plurality of gate wiring lines 15. Of these, the end side-wiring line lead-out portion 20E located on the end side in the Y-axis direction has a greater creepage distance than that of the central side-wiring line lead-out portion 20C located on the central side in the Y-axis direction, and is also led out from the circuit portion 19 at a sharp angle. Thus, the end side-wiring line lead-out portion 20E tends to be more difficult to be routed than the central side-wiring line lead-out portion 20C, and, in order to avoid this, it is necessary to increase the entire space between the plurality of circuit portions 19 and the central side region AAC, which may prevent frame narrowing.

In contrast, as illustrated in FIG. 6, the end side circuit portion 19E according to the present embodiment is configured such that a dimension W1 in the X-axis direction (second direction), which is a direction in which the plurality of circuit portions 19 and the central side region AAC are aligned, is smaller than a dimension W2 in the central side circuit portion 19C in the X-axis direction. Therefore, a space in the X-axis direction between the end side circuit portion 19E and the central side region AAC is secured to be greater than a space between the central side circuit portion 19C and the central side region AAC. As a result, the arrangement density of the plurality of wiring line lead-out portions 20 disposed between the plurality of circuit portions 19 and the central side region AAC is reduced. Thus, the end side-wiring line lead-out portion 20E connected to the end side circuit portion 19E can be easily routed to the end side-gate wiring line 15E in the end side region AAE, and a short circuit between adjacent wiring line lead-out portions 20 is less likely to occur, which is suitable for improving yield. Further, a space between the central side circuit portion 19C and the central side region AAC can be kept small as usual, which is suitable for achieving frame narrowing. Note that the plurality of circuit portions 19 are aligned in the X-axis direction such that the left side end portion (end portion on the central side-outer shape portion 12C and the end side-outer shape portion 12E) illustrated in FIG. 6 forms a linear shape.

Specifically, as illustrated in FIG. 6, the end side circuit portion 19E is configured such that a dimension H1 in the Y-axis direction is greater than a dimension H2 of the central side circuit portion 19C. In other words, although the dimension W1 of the end side circuit portion 19E in the X-axis direction is smaller than the dimension W2 of the central side circuit portion 19C, the dimension H1 in the Y-axis direction is greater than the dimension H2 of the central side circuit portion 19C. Then, an occupancy area of the end side circuit portion 19E acquired by multiplying the dimension W1 in the X-axis direction by the dimension H1 in the Y-axis direction is equal to an occupancy area of the central side circuit portion 19C acquired by multiplying the dimension W2 by the dimension H2. In this way, it is suitable for setting the circuit configuration of the end side circuit portion 19E to be equal to the circuit configuration of the central side circuit portion 19C.

Further, as illustrated in FIG. 6, the plurality of circuit portions 19 include a plurality of intermediate circuit portions 19I disposed so as to be sandwiched between the central side circuit portion 19C and the end side circuit portion 19E in the Y-axis direction. The intermediate circuit portion 19I is configured such that a dimension W3 in the X-axis direction is smaller than the dimension W2 of the central side circuit portion 19C and greater than the dimension W1 of the end side circuit portion 19E. According to such a configuration, a space between the intermediate circuit portion 19I and the central side region AAC can be secured to be greater than a space between the central side circuit portion 19C and the central side region AAC. As a result, the arrangement density of the plurality of wiring line lead-out portions 20 disposed between the plurality of circuit portions 19 and the central side region AAC is further reduced. In this way, the wiring line lead-out portion 20 connected to the intermediate circuit portion 19I can be easily routed to the gate wiring line 15, and a short circuit between adjacent wiring line lead-out portions 20 is less likely to occur, which is suitable for improving yield. Further, a space between the central side circuit portion 19C and the central side region AAC can be kept small as usual, which is suitable for achieving frame narrowing. On the other hand, the dimension W1 in the X-axis direction of the end side circuit portion 19E is set to be smaller than the dimension W3 of the intermediate circuit portion 19I, and thus a space between the end side circuit portion 19E and the central side region AAC can be secured to be greater than a space between the intermediate circuit portion 19I and the central side region AAC. This facilitates routing of the end side-wiring line lead-out portion 20E connected to the end side circuit portion 19E.

Further, as illustrated in FIG. 6, the intermediate circuit portion 19I is configured such that a dimension H3 in the Y-axis direction is greater than the dimension H2 of the central side circuit portion 19C and smaller than the dimension H1 of the end side circuit portion 19E. In other words, although the dimension W3 of the intermediate circuit portion 19I in the X-axis direction is smaller than the dimension W2 of the central side circuit portion 19C and is greater than the dimension W1 of the end side circuit portion 19E, the dimension H3 of the intermediate circuit portion 19I in the Y-axis direction is greater than the dimension H2 of the central side circuit portion 19C and is smaller than the dimension H1 of the end side circuit portion 19E. Then, an occupancy area of the intermediate circuit portion 19I acquired by multiplying the dimension W3 in the X-axis direction by the dimension H3 in the Y-axis direction is equal to an occupancy area of the central side circuit portion 19C acquired by multiplying the dimension W2 by the dimension H2 and is also equal to an occupancy area of the end side circuit portion 19E acquired by multiplying the dimension W1 by the dimension H1. In this way, it is suitable for setting the circuit configuration of the intermediate circuit portion 19I to be equal to the circuit configuration of the central side circuit portion 19C and the circuit configuration of the end side circuit portion 19E.

As described above, the array substrate (circuit substrate) 12 in the present embodiment includes, the glass substrate (substrate) 12GS including, in an outer shape, the central side-outer shape portion 12C having a linear shape, and the end side-outer shape portion 12E that is located on an end side with respect to the central side-outer shape portion 12C in the first direction being the extending direction of the central side-outer shape portion 12C and has a non-linear shape, the display region (wiring line region) AA having a planar shape disposed in a plate surface of the glass substrate 12GS, the display region AA including the central side region AAC including an outer shape along the central side-outer shape portion 12C and the end side region AAE that is located on an end side with respect to the central side region AAC in the first direction and includes an outer shape along the end side-outer shape portion 12E, the plurality of gate wiring lines (wiring lines) 15 disposed in the display region AA, the plurality of gate wiring lines 15 including the central side-gate wiring line (central side wiring line) 15C disposed in the central side region AAC and the end side-gate wiring line (end side wiring line) 15E disposed in the end side region AAE, the non-display region (frame region) NAA disposed surrounding the display region AA in the plate surface of the glass substrate 12GS, the plurality of wiring line lead-out portions 20 disposed in the non-display region NAA and connected to the plurality of wiring lines 15, the plurality of wiring line lead-out portions 20 including the central side-wiring line lead-out portion 20C connected to the central side-gate wiring line 15C and the end side-wiring line lead-out portion 20E connected to the end side-gate wiring line 15E, and the plurality of circuit portions 19 aligned along the first direction in the non-display region NAA, the plurality of circuit portions 19 being disposed side by side and spaced from the central side region AAC and being connected to the plurality of wiring line lead-out portions 20, wherein the plurality of circuit portions 19 include the central side circuit portion 19C connected to at least the central side-wiring line lead-out portion 20C among the plurality of wiring line lead-out portions 20, and the end side circuit portion 19E that is connected to at least the end side-wiring line lead-out portion 20E among the plurality of wiring line lead-out portions 20, is also located on an end side in the first direction with respect to the central side circuit portion 19C, and is configured such that a dimension in the second direction being the direction in which the plurality of circuit portions 19 and the central side region AAC are aligned is smaller than that of the central side circuit portion 19C.

According to such a configuration, a signal supplied from each of the plurality of circuit portions 19 disposed in the non-display region NAA is supplied to each of the plurality of gate wiring lines 15 disposed in the display region AA via each of the plurality of wiring line lead-out portions 20. By the way, the outer shape of the glass substrate 12GS includes the central side-outer shape portion 12C having a linear shape and the end side-outer shape portion 12E having a non-linear shape, and the display region AA accordingly includes the central side region AAC including the outer shape along the central side-outer shape portion 12C and the end side region AAE including the outer shape along the end side-outer shape portion 12E. In the non-display region NAA of the glass substrate 12GS having such a configuration, the plurality of circuit portions 19 are disposed so as to be aligned along the first direction being the extending direction of the central side-outer shape portion 12C, and also disposed side by side and spaced from the central side region AAC. In this way, as compared to a configuration in which a positional relationship among a plurality of transfer circuits is not constant as in the conventional manner, the action of the plurality of circuit portions 19 is easily stabilized, and the design of the circuit configuration of the circuit portion 19 is also facilitated.

On the other hand, the plurality of circuit portions 19 aligned along the first direction include the central side circuit portion 19C connected to at least the central side-wiring line lead-out portion 20C to which the central side-gate wiring line 15C disposed in the central side region AAC is to be connected, and the end side circuit portion 19E connected to at least the end side-wiring line lead-out portion 20E to which the end side-gate wiring line 15E disposed in the end side region AAE is to be connected. Thus, in particular, the end side-wiring line lead-out portion 20E connected to the end side circuit portion 19E and the end side-gate wiring line 15E in the end side region AAE tends to be more difficult to be routed, and, in order to avoid this, it is necessary to increase the entire space between the plurality of circuit portions 19 and the central side region AAC, which may prevent frame narrowing. In this regard, the dimension of the end side circuit portion 19E in the second direction being the direction in which the plurality of circuit portions 19 and the central side region AAC are aligned is configured to be smaller than that of the central side circuit portion 19C, and thus a space between the end side circuit portion 19E and the central side region AAC can be secured to be greater than a space between the central side circuit portion 19C and the central side region AAC. As a result, the end side-wiring line lead-out portion 20E connected to the end side circuit portion 19E can be easily routed to the end side-gate wiring line 15E in the end side region AAE, and a short circuit between the wiring line lead-out portions 20 is less likely to occur, which is suitable for improving yield. Further, a space between the central side circuit portion 19C and the central side region AAC can be kept small as usual, which is suitable for achieving frame narrowing.

Further, the end side circuit portion 19E is configured such that the dimension in the first direction is greater than that of the central side circuit portion 19C. Although the dimension of the end side circuit portion 19E in the second direction is smaller than that of the central side circuit portion 19C, the dimension in the first direction is greater than that of the central side circuit portion 19C. Therefore, an occupancy area of a plate surface of the glass substrate 12GS occupied by the end side circuit portion 19E can be kept equal to an occupancy area occupied by the central side circuit portion 19C, and thus it is suitable for setting the circuit configuration of the end side circuit portion 19E to be equal to the circuit configuration of the central side circuit portion 19C.

Further, an occupancy area occupied by the central side circuit portion 19C and an occupancy area occupied by the end side circuit portion 19E in the plate surface of the glass substrate 12GS are configured to be equal. In this way, it is more suitable when the circuit configuration of the end side circuit portion 19E is the same as the circuit configuration of the central side circuit portion 19C.

Further, the plurality of circuit portions 19 include the intermediate circuit portion 19I that is disposed to be sandwiched between the central side circuit portion 19C and the end side circuit portion 19E in the first direction, and is also configured such that the dimension in the second direction is smaller than that of the central side circuit portion 19C and greater than that of the end side circuit portion 19E. The intermediate circuit portion 19I arranged so as to be sandwiched between the central side circuit portion 19C and the end side circuit portion 19E in the first direction is configured such that the dimension in the second direction is smaller than that of the central side circuit portion 19C, and thus a space between the intermediate circuit portion 19I and the central side region AAC can be secured to be greater than a space between the central side circuit portion 19C and the central side region AAC. As a result, the wiring line lead-out portion 20 connected to the intermediate circuit portion 19I can be easily routed to the gate wiring line 15, and a short circuit between the wiring line lead-out portions 20 is less likely to occur, which is suitable for improving yield. Further, a space between the central side circuit portion 19C and the central side region AAC can be kept small as usual, which is suitable for achieving frame narrowing. On the other hand, the dimension in the second direction of the end side circuit portion 19E is set to be smaller than that of the intermediate circuit portion 19I, and thus a space between the end side circuit portion 19E and the central side region AAC can be secured to be greater than a space between the intermediate circuit portion 19I and the central side region AAC. This facilitates routing of the end side-wiring line lead-out portion 20E connected to the end side circuit portion 19E.

Further, the intermediate circuit portion 19I is configured such that the dimension in the first direction is greater than that of the central side circuit portion 19C and smaller than the dimension of the end side circuit portion 19E. Although the dimension of the intermediate circuit portion 19I in the second direction is smaller than the dimension of the central side circuit portion 19C and is greater than that of the end side circuit portion 19E, the dimension of the intermediate circuit portion 19I in the first direction is greater than that of the central side circuit portion 19C and is smaller than that of the end side circuit portion 19E. Therefore, an occupancy area of the plate surface of the glass substrate 12GS occupied by the intermediate circuit portion 19I can be kept equal to an occupancy area occupied by the central side circuit portion 19C and an occupancy area occupied by the end side circuit portion 19E, and thus it is suitable for setting the circuit configuration of the intermediate circuit portion 19I to be equal to the circuit configuration of the end side circuit portion 19E and the circuit configuration of the central side circuit portion 19C.

Further, the liquid crystal panel (display panel) 10 according to the present embodiment uses the array substrate 12 described above. According to such a liquid crystal panel 10, an improvement in yield in the array substrate 12 is achieved and frame narrowing of the array substrate 12 is also achieved, and thus excellent productivity can be obtained and an excellent appearance can also be obtained.

Second Embodiment

A second embodiment of the present invention will be described with reference to FIG. 7. In the second embodiment, a formation range and the like in the end side region AAE are changed. Note that redundant descriptions of structures, actions, and effects similar to those of the first embodiment described above will be omitted.

Figure 7:
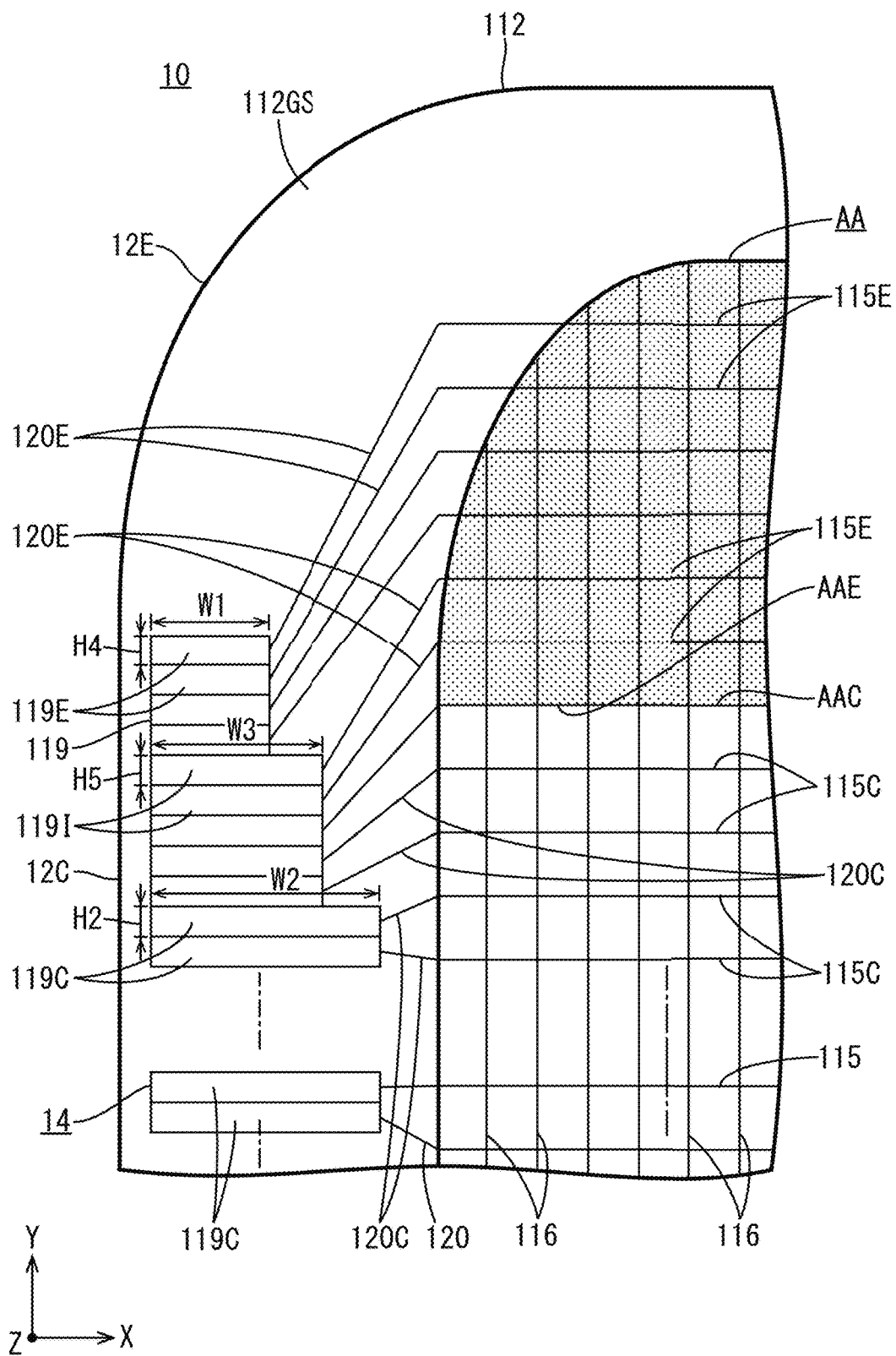
FIG. 7 is a plan view illustrating a gate circuit portion, a gate wiring line, and a wiring line lead-out portion in an array substrate according to a second embodiment of the present invention.

As illustrated in FIG. 7, in the end side region AAE according to the present embodiment, a formation range of the display region AA in the Y-axis direction is expanded further than that of the first embodiment described above. FIG. 7 is a plan view illustrating a circuit portion 119, a gate wiring line 115, and a wiring line lead-out portion 120 in an array substrate 112. Further, in FIG. 7, the end side region AAE of the display region AA is illustrated as being shaded. Specifically, the end side region AAE has a formation range from the gate wiring line 115 in a first stage to the gate wiring line 115 in a 13-th stage being counted from the upper end in the Y-axis direction. Accordingly, the number of source wiring lines 116 intersecting an end side-gate wiring line 115E disposed in the end side region AAE according to an arrangement in the Y-axis direction changes, and the number of source wiring lines 116 intersecting the end side-gate wiring line 115E arranged closer to the end side in the Y-axis direction tends to be reduced. Therefore, it can be said that the end side-gate wiring lines 115E are disposed such that the number of source wiring lines 116 intersecting the end side-gate wiring line 115E is smaller than the number of source wiring lines 116 intersecting a central side-gate wiring line 115C. In this way, a parasitic capacitance generated between the plurality of source wiring lines 116 intersecting the edge side-gate wiring line 115E is smaller than a parasitic capacitance generated between the plurality of source wiring lines 116 intersecting the central side-gate wiring line 115C. As a result, degradation due to the parasitic capacitance is less likely to occur in a scanning signal output from an end side circuit portion 119E and supplied to the end side-gate wiring line 115E via an end side-wiring line lead-out portion 120E, and thus a problem is less likely to arise even when signal output performance of the end side circuit portion 119E is lower than signal output performance of the central side circuit portion 119C. Therefore, it is suitable for reducing the size of the end side circuit portion 119E.

In the present embodiment, as illustrated in FIG. 7, the end side circuit portion 119E is configured such that a dimension H4 in the Y-axis direction is substantially the same as a dimension H2 of the central side circuit portion 119C. Therefore, an occupancy area of the end side circuit portion 119E acquired by multiplying a dimension W1 in the X-axis direction by the dimension H4 in the Y-axis direction is configured to be smaller than an occupancy area of the central side circuit portion 119C acquired by multiplying a dimension W2 by the dimension H2. In this way, since the end side circuit portion 119E is made smaller than the central side circuit portion 119C, the end side-wiring line lead-out portion 120E is more easily routed.

Further, as illustrated in FIG. 7, due to the expansion of the formation range in the end side region AAE as described above, a plurality of intermediate circuit portions 119I include the one connected to the central side-wiring line lead-out portion 120C and the one connected to the end side-wiring line lead-out portion 120E. Specifically, the end side-wiring line lead-out portion 120E to which the end side-gate wiring line 115E is to be connected is connected to the three intermediate circuit portions 119I located close to the end in the Y-axis direction, whereas the central side-wiring line lead-out portion 120C to which the central side-gate wiring line 115C is to be connected is connected to the two intermediate circuit portions 119I located close to the center in the Y-axis direction. This facilitates routing of both of the central side-wiring line lead-out portion 120C and the end side-wiring line lead-out portion 120E connected to each of the plurality of intermediate circuit portions 119I. The intermediate circuit portion 119I is configured such that a dimension H5 in the Y-axis direction is substantially the same as the dimension H2 of the central side circuit portion 119C. Therefore, an occupancy area of the intermediate circuit portion 119I acquired by multiplying a dimension W3 in the X-axis direction by the dimension H5 in the Y-axis direction is configured to be greater than an occupancy area of the end side circuit portion 119E acquired by multiplying the dimension W1 by the dimension H4 and to be smaller than an occupancy area of the central side circuit portion 119C acquired by multiplying the dimension W2 by the dimension H2. In this way, since the intermediate circuit portion 119I is made smaller than the central side circuit portion 119C, the central side-wiring line lead-out portion 120C and the end side-wiring line lead-out portion 120E are more easily routed.

As described above, according to the present embodiment, the plurality of gate wiring lines 115 extend along the second direction, and the plurality of source wiring lines (second wiring lines) 116 that extends along the first direction in the display region AA and is also disposed so as to intersect the plurality of gate wiring lines 115 are provided. The end side-gate wiring line 115E is disposed such that the number of source wiring lines 116 intersecting the end side-gate wiring line 115E is smaller than the number of source wiring lines 116 intersecting the central side gate wiring 115C. In this way, a parasitic capacitance generated between the plurality of source wiring lines 116 intersecting the edge side-gate wiring line 115E is smaller than a parasitic capacitance generated between the plurality of source wiring lines 116 intersecting the central side-gate wiring line 115C. As a result, degradation due to the parasitic capacitance is less likely to occur in a signal output from the end side circuit portion 119E and supplied to the end side-gate wiring line 115E via the end side-wiring line lead-out portion 120E, and thus a problem is less likely to arise even when signal output performance of the end side circuit portion 119E is lower than signal output performance of the central side circuit portion 119C. Therefore, it is suitable for reducing the size of the end side circuit portion 119E.

Further, the occupancy area occupied by the end side circuit portion 119E in the plate surface of the glass substrate 112GS is configured to be smaller than the occupancy area occupied by the central side circuit portion 119C. In this way, since the end side circuit portion 119E is made smaller than the central side circuit portion 119C, the end side-wiring line lead-out portion 120E is more easily routed.

Further, the plurality of intermediate circuit portions 119I are provided, and include the one connected to the central side-wiring line lead-out portion 120C and the one connected to the end side-wiring line lead-out portion 120E. In this way, since the plurality of intermediate circuit portions 119I are each connected to the central side-wiring line lead-out portion 120C and the end side-wiring line lead-out portion 120E, the central side circuit portion 119C located closer to the central side than the intermediate circuit portion 119I in the first direction is connected to the central side-gate wiring line 115C, whereas the end side circuit portion 119E located closer to the end side than the intermediate circuit portion 119I in the first direction is connected to the end side-gate wiring line 115E. This facilitates routing of both of the central side-wiring line lead-out portion 120C and the end side-wiring line lead-out portion 120E connected to each of the plurality of intermediate circuit portions 119I.

Third Embodiment

A third embodiment of the present invention will be described with reference to FIG. 8 or 9. In the third embodiment, a configuration of an end side-wiring line lead-out portion 220E acquired by changing from the above-described first embodiment is illustrated. Note that redundant descriptions of structures, actions, and effects similar to those of the first embodiment described above will be omitted.

Figure 8:
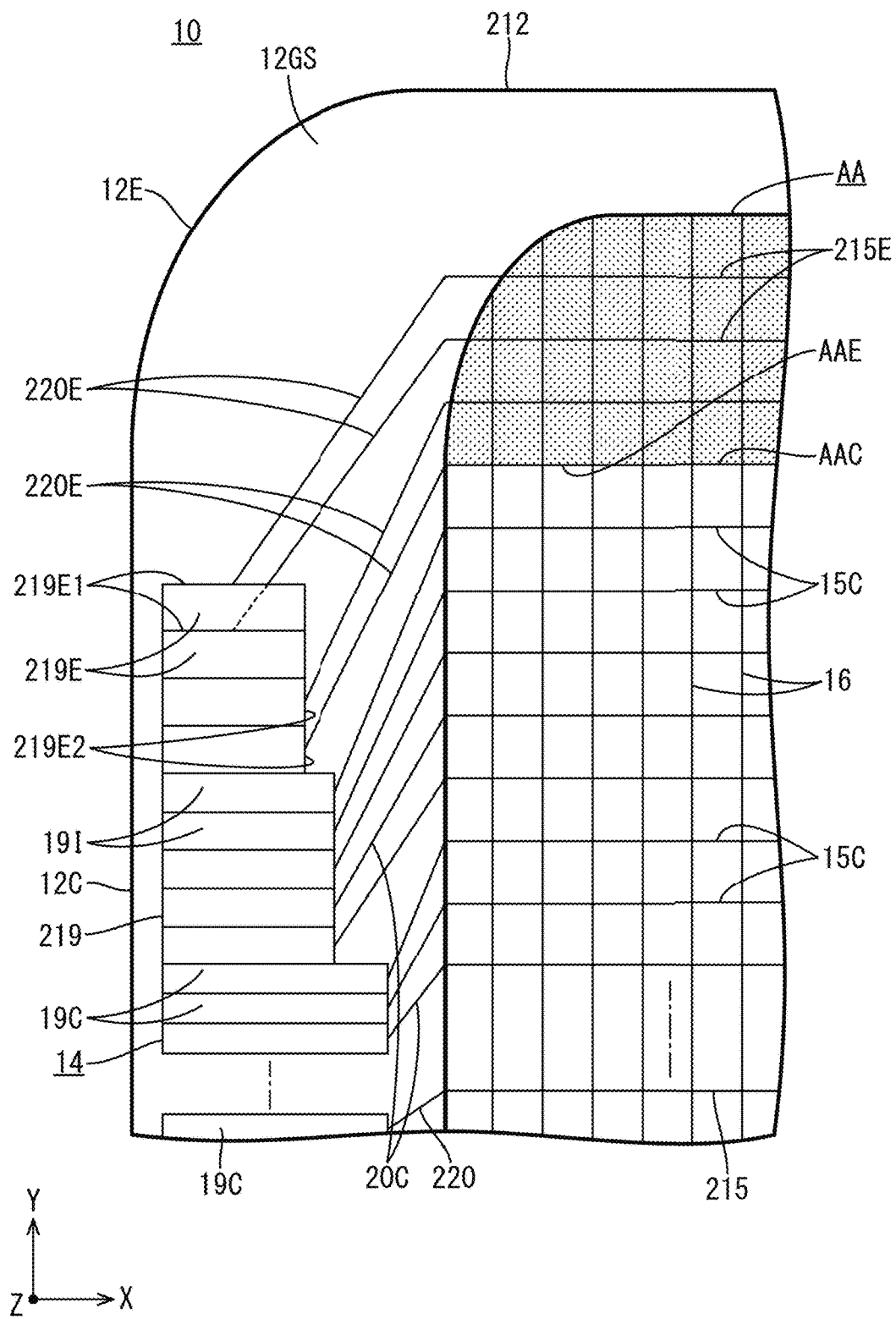
FIG. 8 is a plan view illustrating a gate circuit portion, a gate wiring line, and a wiring line lead-out portion in an array substrate according to a third embodiment of the present invention.

As illustrated in FIG. 8, the plurality of end side-wiring line lead-out portions 220E according to the present embodiment include the one led out from a side portion 219E1 on the end side in the Y-axis direction of the end side circuit portion 219E. FIG. 8 is a plan view illustrating a circuit portion 219, a gate wiring line 215, and a wiring line lead-out portion 220 in an array substrate 212. Further, in FIG. 8, the end side region AAE of the display region AA is illustrated as being shaded. Specifically, among a plurality of end side circuit portions 219E aligned along the Y-axis direction, an end side circuit portion 219E located closest to the end and an end side circuit portion 219E located adjacent to the end side circuit portion 219E located closest to the end (located second closest to the end) are each configured such that the end side-wiring line lead-out portion 220E is routed from the side portion 219E1 on the end side in the Y-axis direction.

Figure 9:
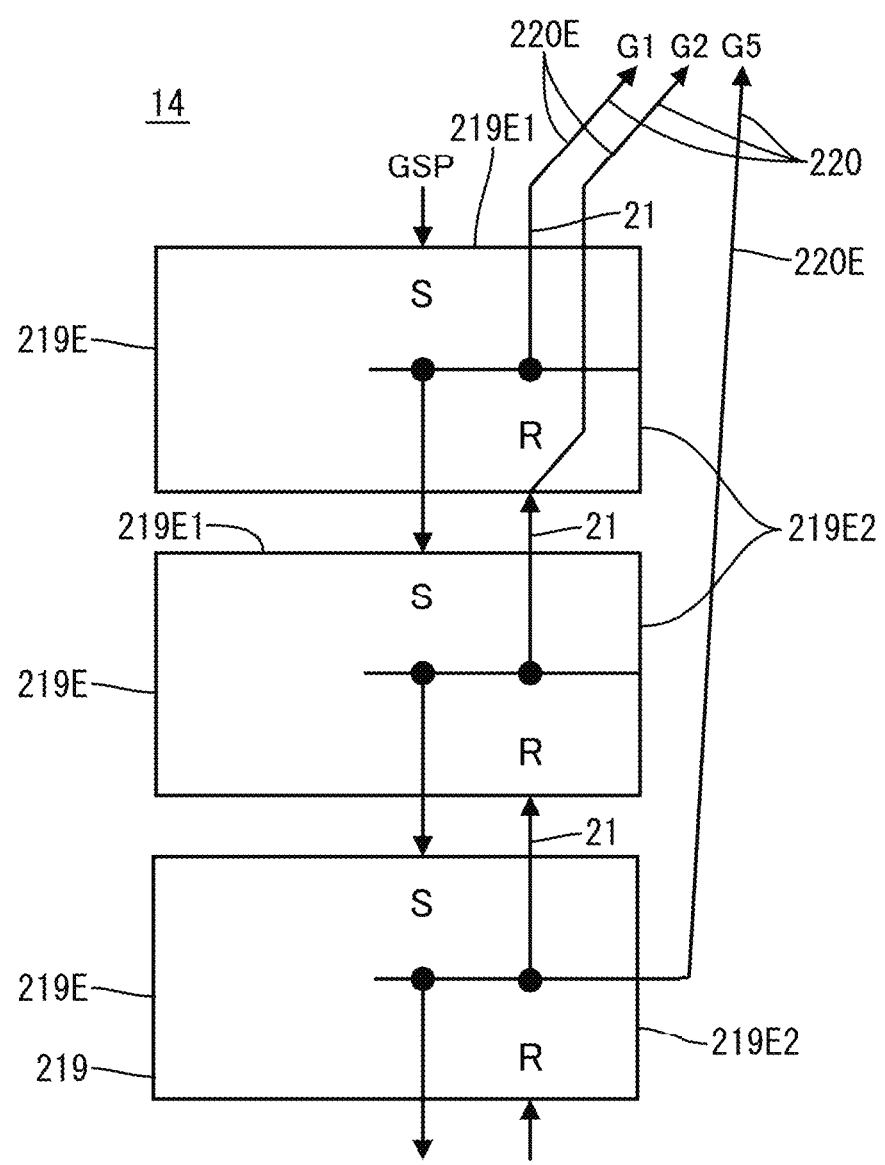
FIG. 9 is a diagram illustrating an electrical relationship between a plurality of circuit portions constituting the gate circuit portion.

Next, a specific lead-out path of the end side-wiring line lead-out portion 220E is described by using FIG. 9. FIG. 9 is a block diagram illustrating a gate circuit portion 214 that supplies a scanning signal to the odd-numbered gate wiring line 215. In the present embodiment, as illustrated in FIG. 9, the plurality of circuit portions 219 constituting the gate circuit portion 14 include reset signal output wiring lines 21 that are all led out from the side portion 219E1 on the end side in the Y-axis direction toward the circuit portion 219 side in a previous stage and output a reset signal R. This reset signal R is the same as a scanning signal G(n) output to the wiring line lead-out portion 220. Then, with regard to two of the end side circuit portion 219E located closest to the end in the Y-axis direction and the end side circuit portion 219E located adjacent to the end side circuit portion 219E located closest to the end, the reset signal output wiring line 21 led out from the side portion 219E1 on the end side in the Y-axis direction constitutes the end side-wiring line lead-out portion 220E. The reset signal output wiring line 21 led out from the end side circuit portion 219E located second closest to the end in the Y-axis direction crosses the end side circuit portion 219E located closest to the end in the Y-axis direction and is also led out from the side portion 219E1 on the end side in the Y-axis direction of the end side circuit portion 219E located closest to the end in the Y-axis direction. Therefore, the end side circuit portion 219E located closest to the end in the Y-axis direction and the end side circuit portion 219E located adjacent to the end side circuit portion 219E located closest to the end do not include the end side-wiring line lead-out portion 220E led out from a side portion 219E2 facing the display region AA side. As a result, as illustrated in FIG. 8, the arrangement density of the wiring line lead-out portions 220 in a region between the end side circuit portion 219E and the central side region AAC can be reduced. Therefore, the end side-wiring line lead-out portion 220E connected to the end side circuit portion 219E can be more easily routed to the end side-gate wiring line 215E in the end side region AAE, and a short circuit between the wiring line lead-out portions 220 is less likely to occur, which is suitable for further improving yield and also further improving frame narrowing. On the other hand, as illustrated in FIG. 9, in all of the third and subsequent end side circuit portions 219E closest to the end in the Y-axis direction, the end side-wiring line lead-out portion 220E provided separately from the reset signal output wiring line 21 is led out from the side portion 219E2 on the display region AA side.

As described above, according to the present embodiment, the end side-wiring line lead-out portion 220E connected to at least the end side circuit portion 219E located closest to an end in the first direction among the plurality of circuit portions 219 is configured to be led out from the side portion 219E1 on an end side in the first direction in the end side circuit portion 219E. In this way, the end side-wiring line lead-out portion 220E connected to at least the end side circuit portion 219E located closest to the end in the first direction among the plurality of circuit portions 219 is avoided being led out from the side portion 219E2 facing the central side region AAC side in the end side circuit portion 219E. As a result, the arrangement density of the wiring line lead-out portions 220 in a region between the end side circuit portion 219E and the central side region AAC can be reduced. Therefore, the end side-wiring line lead-out portion 220E connected to the end side circuit portion 219E can be more easily routed to the end side-gate wiring line 215E in the end side region AAE, and a short circuit between the wiring line lead-out portions 220 is less likely to occur, which is suitable for further improving yield and also further improving frame narrowing.

Fourth Embodiment

A fourth embodiment of the present invention will be described with reference to FIG. 10 or 11. In the fourth embodiment, a configuration of a circuit portion 319 and the like acquired by changing from the above-described first embodiment are illustrated. Note that redundant descriptions of structures, actions, and effects similar to those of the first embodiment described above will be omitted.

Figure 10:
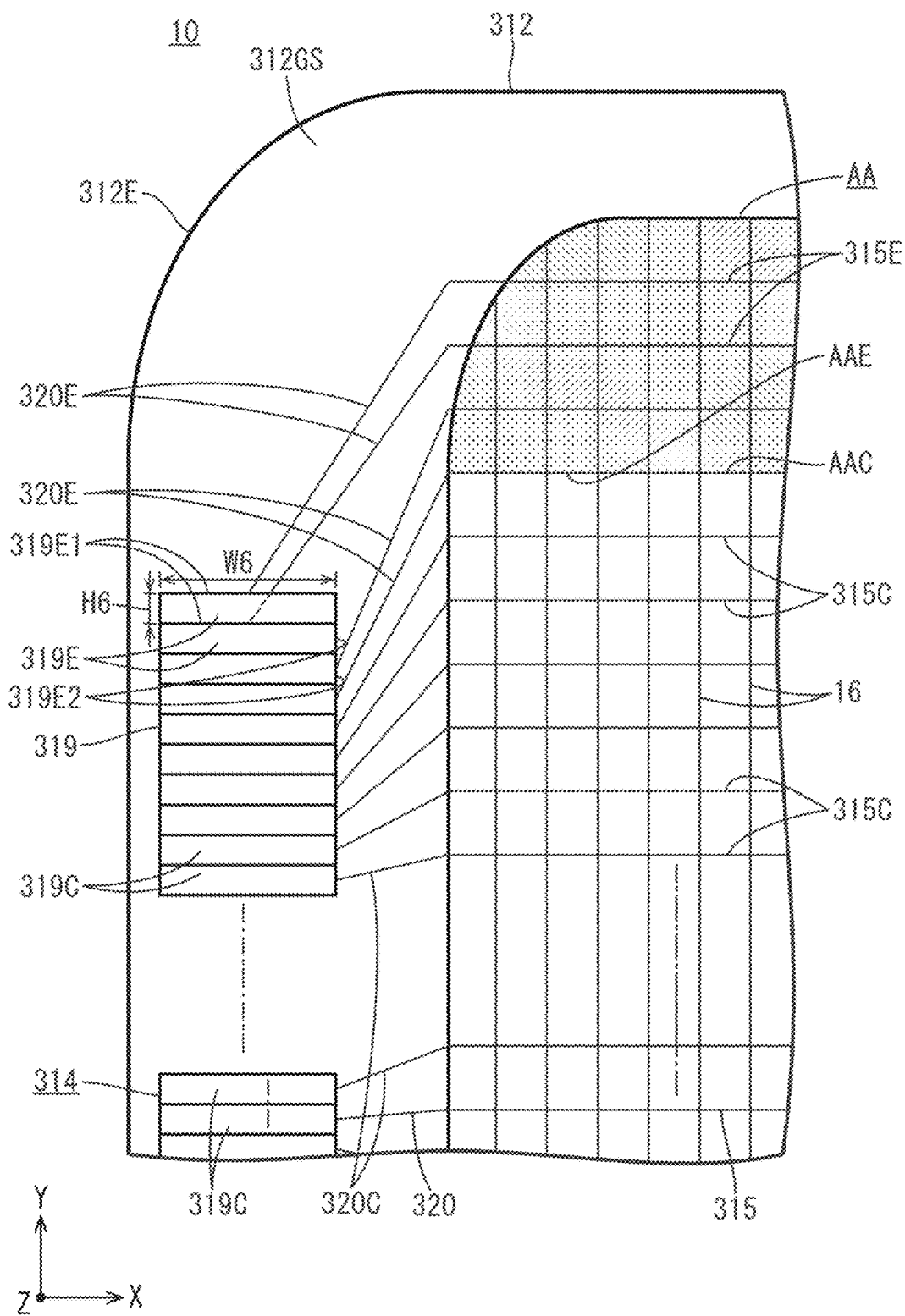
FIG. 10 is a plan view illustrating a gate circuit portion, a gate wiring line, and a wiring line lead-out portion in an array substrate according to a fourth embodiment of the present invention.

As illustrated in FIG. 10, the plurality of circuit portions 319 constituting a gate circuit portion 314 according to the present embodiment are disposed side by side in the non-display region NAA and spaced in the X-axis direction from the central side region AAC. FIG. 10 is a plan view illustrating the circuit portion 319, a gate wiring line 315, and a wiring line lead-out portion 320 in an array substrate 312. Further, in FIG. 10, the end region AAE of the display region AA is illustrated as being shaded. All of the plurality of circuit portions 319 are arranged so as to be sandwiched between a central side-outer shape portion 312C of the array substrate 312 and the central side region AAC in the X-axis direction, and are not sandwiched between an end side-outer shape portion 312E and the end side region AAE. In other words, the plurality of circuit portions 319 are arranged offset to the central side with respect to the end side-outer shape portion 312E and the end side region AAE in the Y-axis direction. The plurality of circuit portions 319 arranged in such a manner are linearly disposed side by side along the Y-axis direction, and the positional relationship thereof is substantially constant. Thus, as compared to a configuration in which a positional relationship among a plurality of transfer circuits is not constant as in the conventional manner, the action of the plurality of circuit portions 319 is easily stabilized, and the design of the circuit configuration of the circuit portion 319 is also facilitated.

As illustrated in FIG. 10, a plurality of central side circuit portions 319C connected to at least central side-wiring line lead-out portions 320C among the plurality of wiring line lead-out portions 320, and a plurality of end side circuit portions 319E connected to at least end side-wiring line lead-out portions 320E among the plurality of wiring line lead-out portions 320 are included in the plurality of circuit portions 319. The end side circuit portion 319E is located on the end side in the Y-axis direction (first direction) with respect to the central side-wiring line lead-out portion 320C. In such a configuration, the plurality of wiring line lead-out portions 320 are routed so as to fan out from the plurality of circuit portions 319 to the plurality of gate wiring lines 315. Of these, the end side-wiring line lead-out portion 320E located on the end side in the Y-axis direction has a greater creepage distance than that of the central side-wiring line lead-out portion 320C located on the central side in the Y-axis direction, and is also led out from the circuit portion 319 at a sharp angle. Thus, the end side-wiring line lead-out portion 320E tends to be more difficult to be routed than the central side-wiring line lead-out portion 320C, and, in order to avoid this, it is necessary to increase the entire space between the plurality of circuit portions 319 and the central side region AAC, which may prevent frame narrowing.

Particularly, as illustrated in FIG. 10, the plurality of central side circuit portions 319C and the plurality of end side circuit portions 319E according to the present embodiment have a configuration different from that in the first embodiment described above in that equal dimensions W6 in the X-axis direction (second direction) and equal dimensions H6 in the Y-axis direction are set. In such a configuration, a space created between the plurality of circuit portions 319 and the central side region AAC in the X-axis direction is substantially constant, and thus it is more difficult to route the plurality of wiring line lead-out portions 320 connected to the plurality of circuit portions 319, and it is more difficult to achieve frame narrowing.

Thus, as illustrated in FIG. 10, the plurality of end side-wiring line lead-out portions 320E according to the present embodiment include the one led out from a side portion 319E1 on the end side in the Y-axis direction of the end side circuit portion 319E. Specifically, the end side circuit portion 319E located closest to the end and the end side circuit portion 319E located adjacent to the end side circuit portion 319E located closest to the end (located second closest to the end) among the plurality of end side circuit portions 319E aligned along the Y-axis direction are each configured such that the end side-wiring line lead-out portion 320E is routed from the side portion 319E1 on the end side in the Y-axis direction.

Figure 11:
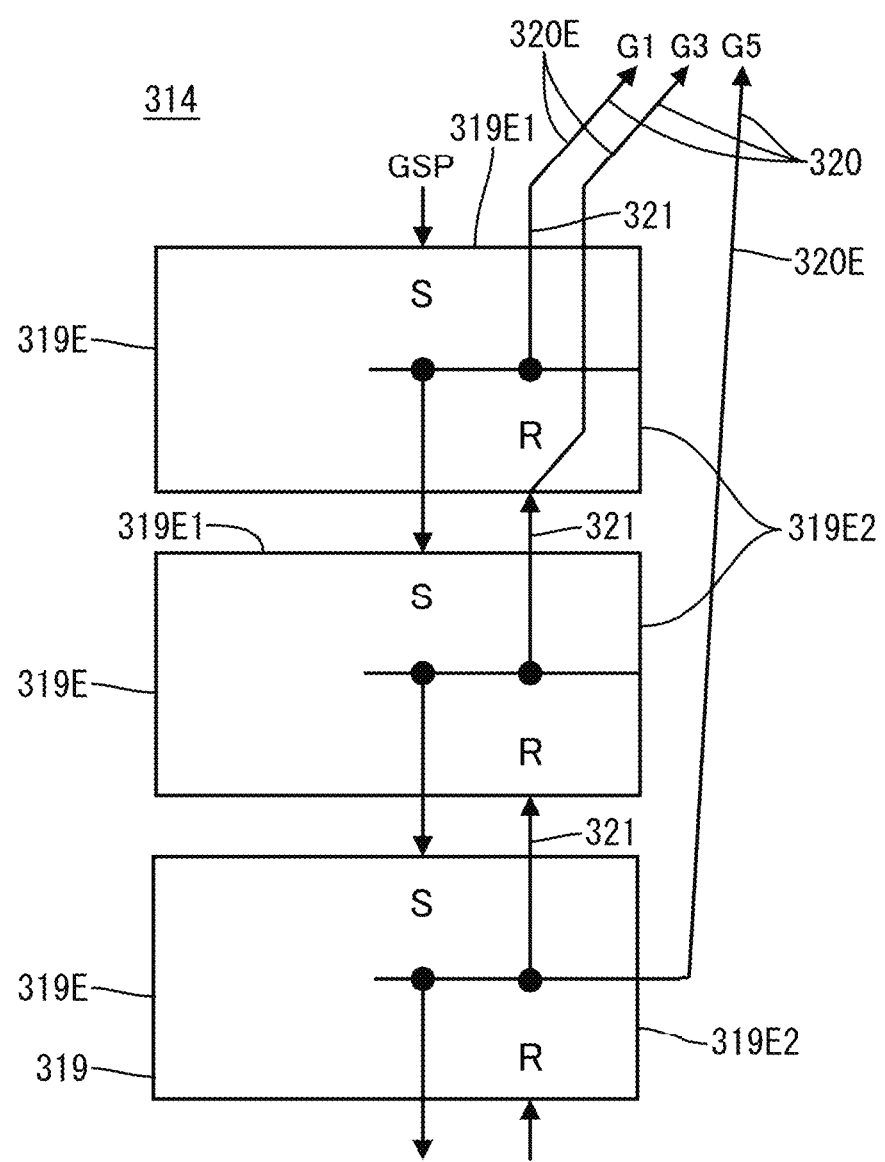
FIG. 11 is a diagram illustrating an electrical relationship between a plurality of circuit portions constituting the gate circuit portion.

Next, a specific lead-out path of the end side-wiring line lead-out portion 320E is described by using FIG. 11. FIG. 11 is a block diagram illustrating the gate circuit portion 314 that supplies a scanning signal to the odd-numbered gate wiring line 315. In the present embodiment, as illustrated in FIG. 11, the plurality of circuit portions 319 constituting the gate circuit portion 314 include reset signal output wiring lines 321 that are all led out from the side portion 319E1 on the end side in the Y-axis direction toward the circuit portion 319 side in a previous stage and output a reset signal R. This reset signal R is the same as a scanning signal G(n) output to the wiring line lead-out portion 320. Then, with regard to two of the end side circuit portion 319E located closest to the end in the Y-axis direction and the end side circuit portion 319E located adjacent to the end side circuit portion 319E located closest to the end, the reset signal output wiring line 321 led out from the side portion 319E1 on the end side in the Y-axis direction constitutes the end side-wiring line lead-out portion 320E. The reset signal output wiring line 321 led out from the end side circuit portion 319E located second closest to the end in the Y-axis direction crosses the end side circuit portion 319E located closest to the end in the Y-axis direction and is also led out from the side portion 319E1 on the end side in the Y-axis direction of the end side circuit portion 319E located closest to the end in the Y-axis direction. Therefore, the end side circuit portion 319E located closest to the end in the Y-axis direction and the end side circuit portion 319E located adjacent to the end side circuit portion 319E located closest to the end do not include the end side-wiring line lead-out portion 320E led out from a side portion 319E2 facing the display region AA side. As a result, as illustrated in FIG. 10, the arrangement density of the wiring line lead-out portions 320 in a region between the end side circuit portion 319E and the central side region AAC can be reduced. Therefore, the end side-wiring line lead-out portion 320E connected to the end side circuit portion 319E can be easily routed to the end side-gate wiring line 315E in the end side region AAE, and a short circuit between the wiring line lead-out portions 320 is less likely to occur, which is suitable for improving yield and also improving frame narrowing. On the other hand, as illustrated in FIG. 11, in all of the third and subsequent end side circuit portions 319E closest to the end in the Y-axis direction, the end side-wiring line lead-out portion 320E provided separately from the reset signal output wiring line 321 is led out from the side portion 319E2 on the display region AA side.

As described above, the array substrate (circuit substrate) 312 according to the present embodiment includes, the glass substrate (substrate) 312GS including, in an outer shape, the central side-outer shape portion 312C having a linear shape, and the end side-outer shape portion 312E that is located on an end side with respect to the central side-outer shape portion 312C in the first direction being the extending direction of the central side-outer shape portion 312C and has a non-linear shape, the display region (wiring line region) AA having a planar shape disposed in a plate surface of the glass substrate 312GS, the display region AA including the central side region AAC including an outer shape along the central side-outer shape portion 312C and the end side region AAE that is located on an end side with respect to the central side region AAC in the first direction and includes an outer shape along the end side-outer shape portion 312E, the plurality of gate wiring lines (wiring lines) 315 disposed in the display region AA, the plurality of gate wiring lines 315 including the central side-gate wiring line (central side wiring line) 315C disposed in the central side region AAC and the end side-gate wiring line (end side wiring line) 315E disposed in the end side region AAE, the non-display region (frame region) NAA disposed surrounding the display region AA in the plate surface of the glass substrate 312GS, the plurality of wiring line lead-out portions 320 disposed in the non-display region NAA and connected to the plurality of gate wiring lines 315, the plurality of wiring line lead-out portions 320 including the central side-wiring line lead-out portion 320C connected to the central side-gate wiring line 315C and the end side-wiring line lead-out portion 320E connected to the end side-gate wiring line 315E, and the plurality of circuit portions 319 aligned along the first direction in the non-display region NAA, the plurality of circuit portions 319 being disposed side by side and spaced from the central side region AAC and being connected to the plurality of wiring line lead-out portions 320, wherein the plurality of circuit portions 319 include the central side circuit portion 319C connected to at least the central side-wiring line lead-out portion 320C among the plurality of wiring line lead-out portions 320, and the end side circuit portion 319E that is connected to at least the end side-wiring line lead-out portion 320E among the plurality of wiring line lead-out portions 320 and is also located on an end side in the first direction with respect to the central side circuit portion 319C, and the end side-wiring line lead-out portion 320E connected to at least the end side circuit portion 319E located closest to an end in the first direction among the plurality of circuit portions 319 is configured to be led out from the side portion 319E1 on an end side in the first direction in the end side circuit portion 319E.

According to such a configuration, a signal supplied from the plurality of circuit portions 319 disposed in the non-display region NAA is supplied to each of the plurality of gate wiring lines 315 disposed in the display region AA via the plurality of wiring line lead-out portions 320. By the way, the outer shape of the glass substrate 312GS includes the central side-outer shape portion 312C having a linear shape and the end side-outer shape portion 312E having a non-linear shape, and the display region AA accordingly includes the central side region AAC including the outer shape along the central side-outer shape portion 312C and the end side region AAE including the outer shape along the end side-outer shape portion 312E. In the non-display region NAA of the glass substrate 312GS having such a configuration, the plurality of circuit portions 319 are disposed so as to be aligned along the first direction being the extending direction of the central side-outer shape portion 312C and also disposed side by side and spaced from the central side region AAC. In this way, as compared to a configuration in which a positional relationship among a plurality of transfer circuits is not constant as in the conventional manner, the action of the plurality of circuit portions 319 is easily stabilized, and the design of the circuit configuration of the circuit portion 319 is also facilitated.

On the other hand, the plurality of circuit portions 319 aligned along the first direction include the central side circuit portion 319C connected to at least the central side-wiring line lead-out portion 320C to which the central side-gate wiring line 315C disposed in the central side region AAC is to be connected, and the end side circuit portion 319E connected to at least the end side-wiring line lead-out portion 320E to which the end side-gate wiring line 315E disposed in the end side region AAE is to be connected. Thus, in particular, the end side-wiring line lead-out portion 320E connected to the end side circuit portion 319E and the end side-gate wiring line 315E in the end side region AAE tends to be more difficult to be routed, and, in order to avoid this, it is necessary to increase the entire space between the plurality of circuit portions 319 and the central side region AAC, which may prevent frame narrowing. In this regard, the end side-wiring line lead-out portion 320E connected to at least the end side circuit portion 319E located closest to the end in the first direction among the plurality of circuit portions 319 is configured so as to be led out from the side portion 319E1 on the end side in the first direction in the end side circuit portion 319E, and is avoided being led out from the side portion 319E2 facing the central side region AAC side in the end side circuit portion 319E. As a result, the arrangement density of the wiring line lead-out portions 320 in a region between the end side circuit portion 319E and the central side region AAC can be reduced. Therefore, the end side-wiring line lead-out portion 320E connected to the end side circuit portion 319E can be easily routed to the end side-gate wiring line 315E in the end side region AAE, and a short circuit between the wiring line lead-out portions 320 is less likely to occur, which is suitable for improving yield. Further, a space between the plurality of circuit portions 319 and the central side region AAC can be kept small as usual, which is suitable for achieving frame narrowing.

Other Embodiments

The present invention is not limited to the embodiments described above and illustrated by the drawings, and embodiments such as those described below are also included within the technical scope of the present invention.

(1) Each of the embodiments described above illustrates the case where all of the central side-wiring line lead-out portions are non-connected to the end side circuit portions, but some of the central side-wiring line lead-out portions may be connected to some of the end side circuit portions.

(2) Each of the embodiments described above illustrates the case where all of the end side-wiring line lead-out portions are non-connected to the central side circuit portions, but some of the end side-wiring line lead-out portions may be connected to some of the central side circuit portions.

(3) The first and third embodiments described above illustrates the case where the end side-wiring line lead-out portions are non-connected to all of the intermediate circuit portions, but some of the end side-wiring line lead-out portion may be configured to be connected to some of the intermediate circuit portions similarly to the second embodiment.

(4) The second embodiment described above illustrates the case where some of the end side-wiring line lead-out portions are connected to some of the intermediate circuit portions, but the end side-wiring line lead-out portions may be configured to be non-connected to all of the intermediate circuit portions similarly to the first and third embodiments.

(5) The first to third embodiments described above illustrate the case where the plurality of intermediate circuit portions include the one connected to the central side-wiring line lead-out portion, but the plurality of intermediate circuit portions may not include the one connected to the central side-wiring line lead-out portion, and the respective end side-wiring line lead-out portions may be connected to all of the intermediate circuit portions.

(6) The first to third embodiments described above illustrate the case where the respective dimensions in the X-axis direction and the Y-axis direction in the plurality of intermediate circuit portions are aligned in the same manner, but the plurality of intermediate circuit portions may include respective different dimensions in the X-axis direction and the Y-axis direction. In this case, when the intermediate circuit portion located on the end side in the Y-axis direction is a first intermediate circuit portion and the intermediate circuit portion located on the central side in the Y-axis direction is a second intermediate circuit portion, a dimension of the first intermediate circuit portion in the X-axis direction is preferably smaller than that of the second intermediate circuit portion, and a dimension thereof in the Y-axis direction is greater than that of the second intermediate circuit portion, which is not necessarily limited thereto.

(7) The first to third embodiments described above illustrate the case where the intermediate circuit portion is included in the plurality of circuit portions, but the intermediate circuit portion can be omitted.

(8) The first and third embodiments described above illustrate the case where occupancy areas of the plate surface of the array substrate respectively occupied by the end side circuit portion, the central side circuit portion, and the intermediate circuit portion are equal, but occupancy areas respectively occupied by the end side circuit portion, the central side circuit portion, and the intermediate circuit portion may be different.

(9) The second embodiment described above illustrates the case where the dimensions in the Y-axis direction are set to be the same in the end side circuit portion, the central side circuit portion, and the intermediate circuit portion, but the dimensions in the Y-axis direction may be slightly different in the end side circuit portion, the central side circuit portion, and the intermediate circuit portion.

(10) Technical matters described the second and third embodiments described above can also be combined.

(11) The third and fourth embodiments described above illustrate the case where the end side-wiring line lead-out portions connected to two end side circuit portions counted from the end in the Y-axis direction are led out from the side portion on the end side in the Y-axis direction in the end side circuit portion, but the end side-wiring line lead-out portions connected to three or more end side circuit portions counted from the end in the Y-axis direction may be configured to be led out from the side portion on the end side in the Y-axis direction in the end side circuit portion. Further, only the end side-wiring line lead-out portion connected to one end side circuit portion located closest to the end in the Y-axis direction may be led out from the side portion on the end side in the Y-axis direction in the end side circuit portion.

(12) Each of the embodiments described above illustrates the case where a pair of the gate circuit portions are provided so as to sandwich the display region from both sides in the X-axis direction, but only one gate circuit portion may be provided so as to be adjacent to one end side in the X-axis direction with respect to the display region. In this case, the plurality of circuit portions constituting the gate circuit portion are connected in the layout order to the plurality of gate wiring lines by interposing the plurality of wiring line lead-out portions.

(13) In addition to each of the embodiments described above, a specific planar shape of the array substrate and the display region (particularly, a specific planar shape of the end side-outer shape portion and the end side region) can be changed as appropriate.

(14) Each of the embodiments described above exemplifies a transmissive liquid crystal panel that performs display by using light from a backlight device that is an external light source, but a reflective liquid crystal panel that performs display by using external light may be used, and, in this case, a backlight device may be omitted. Further, a semi-transparent liquid crystal panel may be used.

(15) In each of the embodiments described above, a TFT is used as a switching element of the liquid crystal panel, but the disclosure can also be applied to a liquid crystal panel using a switching element (for example, a thin film diode (TFD)) other than a TFT, and may also be applied to a liquid crystal panel that performs display in black and white in addition to a liquid crystal panel that performs display in color.

(16) In each of the embodiments described above, a liquid crystal panel is exemplified as a display panel, but other kinds of display panels (plasma display panel (PDP), organic EL panel, microcapsular electrophoretic display panel (EPD), Micro Electro Mechanical Systems (MEMS) display panel, and the like) may be used.

What is claimed is:
1. A circuit substrate, comprising:
 a substrate including, in a first outer shape, a central side-outer shape portion having a linear shape, and an end side-outer shape portion that is located on an end side with respect to the central side-outer shape portion in a first direction being an extending direction of the central side-outer shape portion and has a non-linear shape;
 a wiring line region having a planar shape disposed in a plate surface of the substrate, the wiring line region including a central side region including a second outer shape along the central side-outer shape portion and an end side region that is located on an end side with respect to the central side region in the first direction and includes a third outer shape along the end side-outer shape portion;
 a plurality of wiring lines disposed in the wiring line region, the plurality of wiring lines including a central side wiring line disposed in the central side region and an end side wiring line disposed in the end side region;
 a frame region disposed surrounding the wiring line region in the plate surface of the substrate;
 a plurality of wiring line lead-out portions disposed in the frame region and connected to the plurality of wiring lines, the plurality of wiring line lead-out portions including a central side-wiring line lead-out portion connected to the central side wiring line and an end side-wiring line lead-out portion connected to the end side wiring line; and
 a plurality of circuit portions aligned along the first direction in the frame region, the plurality of circuit portions being disposed side by side and spaced from the central side region and being connected to the plurality of wiring line lead-out portions,
 wherein the plurality of circuit portions include a central side circuit portion connected to at least the central side-wiring line lead-out portion among the plurality of wiring line lead-out portions, and an end side circuit portion that is connected to at least the end side-wiring line lead-out portion among the plurality of wiring line lead-out portions, is also located on an end side in the first direction with respect to the central side circuit portion, and is configured such that a dimension in a second direction being a direction in which the plurality of circuit portions and the central side region are aligned is smaller than that of the central side circuit portion, the second direction being different from the first direction.

2. The circuit substrate according to claim 1, wherein the end side circuit portion is configured such that a dimension in the first direction is greater than that of the central side circuit portion.

3. The circuit substrate according to claim 2, wherein an occupancy area occupied by the central side circuit portion and an occupancy area occupied by the end side circuit portion in the plate surface of the substrate are configured to be equal.

4. The circuit substrate according to claim 1, wherein the plurality of circuit portions include an intermediate circuit portion that is disposed to be sandwiched between the central side circuit portion and the end side circuit portion in the first direction, and is also configured such that a dimension in the second direction is smaller than that of the central side circuit portion and greater than that of the end side circuit portion.

5. The circuit substrate according to claim 4, wherein the plurality of intermediate circuit portions are provided, and the intermediate circuit portions include the one connected to the central side-wiring line lead-out portion and the one connected to the end side-wiring line lead-out portion.

6. The circuit substrate according to claim 4, wherein the intermediate circuit portion is configured such that a dimension in the first direction is greater than that of the central side circuit portion and smaller than that of the end side circuit portion.

7. The circuit substrate according to claim 1, wherein the plurality of wiring lines extend along the second direction, the circuit substrate further comprises a plurality of second wiring lines that extend along the first direction in the wiring line region, and also intersects the plurality of wiring lines, and the end side wiring line is disposed such that the number of the second wiring lines intersecting the end side wiring line is smaller than the number of the second wiring lines intersecting the central side wiring line.

8. The circuit substrate according to claim 7, wherein an occupancy area occupied by the end side circuit portion in the plate surface of the substrate is configured to be smaller than an occupancy area occupied by the central side circuit portion.

9. The circuit substrate according to claim 1, wherein the end side-wiring line lead-out portion connected to at least the end side circuit portion located closest to an end in the first direction among the plurality of circuit portions is configured to be led out from a side portion on an end side in the first direction in the end side circuit portion.

10. A circuit substrate, comprising:

a substrate including, in a first outer shape, a central side-outer shape portion having a linear shape, and an end side-outer shape portion that is located on an end side with respect to the central side-outer shape portion in a first direction being an extending direction of the central side-outer shape portion and has a non-linear shape;

a wiring line region having a planar shape disposed in a plate surface of the substrate, the wiring line region including a central side region including a second outer shape along the central side-outer shape portion and an end side region that is located on an end side with respect to the central side region in the first direction and includes a third outer shape along the end side-outer shape portion;

a plurality of wiring lines disposed in the wiring line region, the plurality of wiring lines including a central side wiring line disposed in the central side region and an end side wiring line disposed in the end side region;

a frame region disposed surrounding the wiring line region in the plate surface of the substrate;

a plurality of wiring line lead-out portions disposed in the frame region and connected to the plurality of wiring lines, the plurality of wiring line lead-out portions including a central side-wiring line lead-out portion connected to the central side wiring line and an end side-wiring line lead-out portion connected to the end side wiring line; and a plurality of circuit portions aligned along the first direction in the frame region, the plurality of circuit portions being disposed side by side and spaced from the central side region and being connected to the plurality of wiring line lead-out portions, wherein the plurality of circuit portions include a central side circuit portion connected to at least the central side-wiring line lead-out portion among the plurality of wiring line lead-out portions, and an end side circuit portion that is connected to at least the end side-wiring line lead-out portion among the plurality of wiring line lead-out portions and is also located on an end side in the first direction with respect to the central side circuit portion, and the end side-wiring line lead-out portion connected to at least the end side circuit portion located closest to an end in the first direction among the plurality of circuit portions is configured to be led out from a side portion on an end side in the first direction in the end side circuit portion.

11. A display panel using the circuit substrate according to claim 1.

* * * * *